US010275056B2

(12) United States Patent
Jeong et al.

(10) Patent No.: US 10,275,056 B2
(45) Date of Patent: Apr. 30, 2019

(54) METHOD AND APPARATUS FOR PROCESSING INPUT USING DISPLAY

(71) Applicant: Samsung Electronics Co., Ltd., Suwon-si, Gyeonggi-do (KR)

(72) Inventors: Seog-Hee Jeong, Suwon-si (KR); Haeng-Jin Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 14/666,580

(22) Filed: Mar. 24, 2015

(65) Prior Publication Data
US 2015/0331511 A1 Nov. 19, 2015

(30) Foreign Application Priority Data

May 19, 2014 (KR) .................. 10-2014-0059597

(51) Int. Cl.
*G06F 3/041* (2006.01)
*H04M 1/725* (2006.01)
*H04N 21/422* (2011.01)
*G06F 3/0488* (2013.01)

(52) U.S. Cl.
CPC .......... *G06F 3/041* (2013.01); *G06F 3/04883* (2013.01); *H04M 1/72533* (2013.01); *H04N 21/4222* (2013.01); *G06F 2203/0383* (2013.01); *G06F 2203/04104* (2013.01)

(58) Field of Classification Search
CPC .................. G06F 3/041; G06F 3/04883; G06F 2203/0383; G06F 2203/04104; H04M 1/72533; H04N 21/4222
See application file for complete search history.

(56) References Cited

U.S. PATENT DOCUMENTS

| 5,956,019 A | * | 9/1999 | Bang | ................... G06F 3/03547 345/157 |
| 2008/0001927 A1 | * | 1/2008 | Yoshida | ................ G06F 3/0488 345/173 |
| 2009/0187860 A1 | * | 7/2009 | Fleck | .................... G06F 3/0482 715/834 |

(Continued)

FOREIGN PATENT DOCUMENTS

| CN | 102341776 A | 2/2012 |
| JP | 2010-526367 A | 7/2010 |

(Continued)

OTHER PUBLICATIONS

Japanese Office Action; dated Jan. 15, 2019; Japanese Patent Application No. 2015-096780.

(Continued)

*Primary Examiner* — Roberto W Flores
(74) *Attorney, Agent, or Firm* — Jefferson IP Law, LLP

(57) ABSTRACT

A method for processing an input is provided. The method includes obtaining a user input through a display that is functionally connected to an electronic device, determining an angle corresponding to the user input by defining a first axis for the display as a reference axis, determining a second axis for the display as the reference axis based on at least the angle, and performing at least one event corresponding to the user input on at least one external device that is functionally connected to the electronic device, based on the second axis.

17 Claims, 9 Drawing Sheets

(56) References Cited

U.S. PATENT DOCUMENTS

| | | | |
|---|---|---|---|
| 2009/0327964 A1* | 12/2009 | Mouilleseaux | G06F 3/0482 715/834 |
| 2010/0025123 A1 | 2/2010 | Lee et al. | |
| 2010/0127982 A1 | 5/2010 | Van Meeteren | |
| 2010/0306702 A1* | 12/2010 | Warner | G06F 3/0482 715/811 |
| 2011/0163981 A1 | 7/2011 | Ito et al. | |
| 2011/0285651 A1* | 11/2011 | Temple | G06F 3/04883 345/173 |
| 2011/0310049 A1 | 12/2011 | Homma et al. | |
| 2012/0026111 A1 | 2/2012 | Kasahara et al. | |
| 2012/0030624 A1* | 2/2012 | Migos | G06F 3/0482 715/830 |
| 2012/0154311 A1 | 6/2012 | Iijima et al. | |
| 2012/0176336 A1* | 7/2012 | Yamada | G06F 1/1626 345/173 |
| 2012/0210268 A1 | 8/2012 | Hilbrink et al. | |
| 2012/0293456 A1* | 11/2012 | Ikeda | G06F 1/1626 345/174 |
| 2013/0176214 A1 | 7/2013 | Chao et al. | |
| 2013/0278565 A1 | 10/2013 | Park | |
| 2013/0300704 A1 | 11/2013 | Takahashi et al. | |
| 2014/0022192 A1* | 1/2014 | Hatanaka | G06F 3/041 345/173 |
| 2014/0149921 A1* | 5/2014 | Hauser | G06F 3/0485 715/784 |

FOREIGN PATENT DOCUMENTS

| | | |
|---|---|---|
| JP | 2011138457 A | 7/2011 |
| JP | 2012032853 A | 2/2012 |
| JP | 2012133481 A | 7/2012 |
| WO | 2012/102416 A1 | 8/2012 |

OTHER PUBLICATIONS

Chinese State Intellectual Property Office; Chinese Office Action; dated Dec. 29, 2018; Application No. 201510254977.0; China.

* cited by examiner

METHOD AND APPARATUS FOR PROCESSING INPUT USING DISPLAY

CROSS-REFERENCE TO RELATED APPLICATION(S)

This application claims the benefit under 35 U.S.C. § 119(a) of a Korean patent application filed on May 19, 2014 in the Korean Intellectual Property Office and assigned Serial number 10-2014-0059597, the entire disclosure of which is hereby incorporated by reference.

TECHNICAL FIELD

The present disclosure relates to a method for processing an input. More particularly, the present disclosure relates to a method and apparatus for processing an input using a display.

BACKGROUND

In recent years, along with the development of information & communication technology and semiconductor technology, various electronic devices (e.g., mobile phones, tablet Personal Computers (PCs), Personal Digital Assistants (PDAs) or the like) have increasingly been fabricated with a small size, a slim shape, a convenient grip and light weight, and have provided a variety of functions desired by users. For example, an electronic device may output a variety of information using a display (e.g., a touch screen including a touch panel), and may receive an input (e.g., touch or hovering) by the user. The user may select his or her desired information by touching (or hovering) specific information in the variety of information provided on the display, and may control the electronic device without using a separate key (e.g., a key of a hardware keypad).

The electronic device may, for example, support communication between multiple electronic devices through wired/wireless communication modules (e.g., Local Area Network (LAN), Wireless LAN (WLAN), Wireless Fidelity (WiFi), Near Field Communication (NFC), Infrared Data Association (IrDA), Zigbee, Bluetooth (BT), or cellular modules). The user may exchange information between multiple electronic devices using wired/wireless communication, and may remotely control another electronic device (e.g., a Television (TV) communicating with a mobile phone) on one electronic device (e.g., a mobile phone).

According to the technology of the related art, an electronic device may determine an area on a display, which is touched (or hovered) by a part of the user's body or an object (e.g., stylus or electronic pen), and perform an event (e.g., execution of an application, control of screen brightness, control of another electronic device, or the like) corresponding to the user's input depending on the touched area. However, the electronic device may, for example, distinguish each of various areas (e.g., areas in which icons and software keypad's numbers or letters are displayed) on the display, not by a separate hardware device (e.g., a hardware keypad), but by software such as a text or an icon included in one image (e.g., one image displayed on the display). Accordingly, the user may have difficulty in distinguishing the areas such as various icons or texts which are displayed and distinguished in various areas on the display, only with the tactile sensation. In addition, if the user does not directly watch the display with his or her eyes, an area unwanted by the user may be touched, so events unintended by the user may be executed.

For example, an electronic device (e.g., a mobile phone) may be used as a remote control device (e.g., a remote controller) that can control operations of another electronic device (e.g., a TV). For example, upon obtaining a user input of dragging, from left to right, a display that is functionally connected to (e.g., mounted in) an electronic device, the electronic device (e.g., a mobile phone) may switch a channel of another electronic device (e.g., a TV) (e.g., may switch from a low-numbered channel to a high-numbered channel). On the other hand, upon obtaining a user input of dragging the display of the electronic device from bottom to top, the electronic device may raise the volume of another electronic device.

In this case, the user may enter commands for controlling another electronic device (e.g., a TV) on the display of an electronic device (e.g., a mobile phone) with his or her hands, while watching the screen of another electronic device with his or her eyes. However, if the user does not watch the display of the electronic device, the user's drag direction may be different from the user's desired direction due to various factors such as the direction in which the electronic device is located, or the angle between the user and the electronic device. For example, even though the user has wanted to change the channel by dragging right the display of the electronic device, the volume of another electronic device may be changed, as the dragged input direction is recognized as a down direction on the display. As a result, the electronic device may perform other events depending on the misinterpreted user's input, instead of performing the user's desired events (e.g., channel switching) on another electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an input processing method and apparatus for performing an event (e.g., channel switching, muting, volume change, or screen control for another electronic device) corresponding to a user input by changing a reference axis of a display, used for determining a user input, based on the user input.

In accordance with an aspect of the present disclosure, a method for processing an input is provided. The method includes obtaining a user input through a display that is functionally connected to an electronic device, determining an angle corresponding to the user input by defining a first axis for the display as a reference axis, determining a second axis for the display as the reference axis based on at least the angle, and performing at least one event corresponding to the user input on at least one external device that is functionally connected to the electronic device, based on the second axis.

In accordance with another aspect of the present disclosure, an electronic device for processing an input is provided. The electronic device includes a display configured to obtain a user input, a memory configured to store information associated with the user input, and an input processing module that is functionally connected to the memory. The input processing module may be configured to, determine an angle corresponding to the user input by defining a first axis for the display as a reference axis, determine a second axis for the display as the reference axis based on at least the angle, and perform at least one event corresponding to the user input on at least one external device that is functionally connected to the electronic device, based on the second axis.

In accordance with another aspect of the present disclosure, a non-transitory computer-readable medium recording a program for executing operations is provided. The non-transitory computer-readable medium includes obtaining a user input through a display, determining an angle of the user input by defining a first axis for the display as a reference axis, changing a second axis for the display as the reference axis based on at least the angle, and performing at least one event corresponding to the user input on at least one external device that is functionally connected to an electronic device, based on the second axis.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
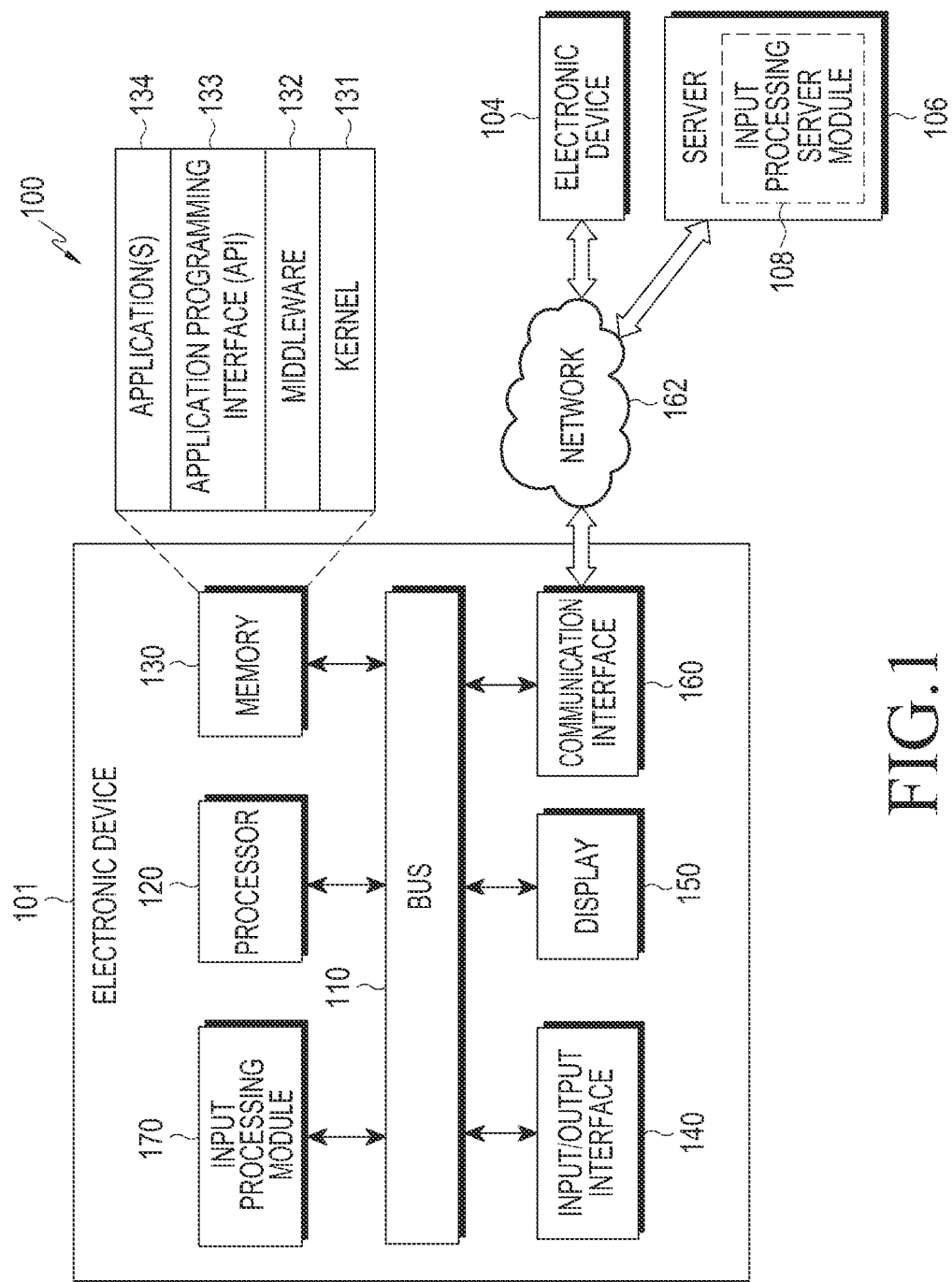
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device according to various embodiments of the present disclosure may be a device including a communication function. For example, the electronic device may include at least one of a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), a digital audio player, a mobile medical device, a camera, and a wearable device (e.g., Head-Mounted-Device (HMD) (such as electronic eyeglasses), electronic apparel, electronic bracelet, electronic necklace, electronic accessory (or accessory), electronic tattoo, smart watch or the like).

According to some embodiments of the present disclosure, the electronic device may be a smart home appliance having a communication function. The smart home appliance may, for example, include at least one of a Television (TV), a Digital Video Disk (DVD) player, an audio system, a refrigerator, an air conditioner, a cleaner, an oven, a microwave oven, a washer, an air purifier, a set-top box, a TV box (e.g., Samsung HomeSync™, Apple TV™, or Google TV™), a game console, an electronic dictionary, an electronic key, a camcorder and an electronic picture frame.

According to some embodiments of the present disclosure, the electronic device may include at least one of a medical device (e.g., Magnetic Resonance Angiography (MRA), Magnetic Resonance Imaging (MRI), Computed Tomography (CT), medical camcorder, ultrasonic equipment, and the like), a navigation device, a Global Positioning System (GPS) receiver, an Event Data Recorder (EDR), a Flight Data Recorder (FDR), a car infotainment device, a marine electronic equipment (e.g., a marine navigation device, a gyro compass, and the like), an avionics, security equipment, a car head unit, an industrial or household robot, Automatic Teller's Machine (ATM) for banks, and a Point Of Sale (POS) for shops.

According to some embodiments of the present disclosure, the electronic device may include at least one of a part of furniture or building/structure having a communication function, an electronic board, an electronic signature receiving device, a projector, and various measuring instruments (e.g., water, electricity, gas or radio meters). The electronic device according to various embodiments of the present disclosure may be any one of the aforementioned various devices or a combination thereof. Also, the electronic device according to various embodiments of the present disclosure may be a flexible device. It will be apparent to those of ordinary skill in the art that the electronic device according to various embodiments of the present disclosure is not limited to the aforementioned devices.

The electronic device according to various embodiments of the present disclosure will now be described with reference to the accompanying drawings. The term 'user' used in various embodiments of the present disclosure may refer to a person who uses the electronic device, or a device (e.g., an intelligent electronic device) that uses the electronic device.

FIG. 1 illustrates a network environment 100 including an electronic device 101 according to various embodiments of the present disclosure.

Referring to FIG. 1, the electronic device 101 may include a bus 110, a processor 120, a memory 130, an Input/Output (I/O) interface 140, a display 150, a communication interface 160, and an input processing module 170.

The bus 110 may be a circuit that connects the aforementioned components to each other, and transfers communication information (e.g., a control message) between the aforementioned components.

The processor 120 may, for example, receive a command from the aforementioned other components (e.g., the memory 130, the I/O interface 140, the display 150, the communication interface 160, the input processing module 170, or the like) through the bus 110, decrypt the received command, and perform an operation or data processing corresponding to the decrypted command.

The memory 130 may store the command or data, which is received from the processor 120 or other components (e.g., the I/O interface 140, the display 150, the communication interface 160, the input processing module 170 or the like), or is generated by the processor 120 or other components. The memory 130 may, for example, include programming modules such as a kernel 131, a middleware 132, an Application Programming Interface (API) 133, an application(s) 134, or the like. Each of the aforementioned programming modules may be configured by software, firmware, hardware, or a combination of at least two of them.

The kernel 131 may control or manage the system resources (e.g., the bus 110, the processor 120, the memory 130 or the like) which are used in performing the operation or function implemented in the other programming modules (e.g., the middleware 132, the API 133 or the application(s) 134). The kernel 131 may provide an interface by which the middleware 132 the API 133 or the application(s) 134 may access individual components of the electronic device 101 and control or manage the individual components.

The middleware 132 may serve as an intermediary so that the API 133 or the application(s) 134 may exchange data with the kernel 131 by communicating with the kernel 131. The middleware 132 may perform control (e.g., scheduling or load balancing) in response to operation requests received from the application(s) 134, using, for example, a method of assigning a priority capable of using the system resources (e.g., the bus 110, the processor 120, the memory 130, or the like) of the electronic device 101 to at least one of the application(s) 134.

The API 133, which is an interface for controlling the function provided from the kernel 131 or the middleware 132 by the application(s) 134, may, for example, include at least one interface or function (e.g., command) for file control, window control, image processing or character control.

In accordance with various embodiments of the present disclosure, the application(s) 134 may include a Short Message Service (SMS)/Multimedia Messaging Service (MMS) application, an electronic mail (E-mail) application, a calendar application, an alarm application, a healthcare application (e.g., an application for measuring the exercise, blood glucose or the like), an environmental information application (e.g., an application for providing pressure, humidity or temperature information), or the like. Additionally or alternatively, the application(s) 134 may be an application related to information exchange between the electronic device 101 and an external electronic device (e.g., an electronic device 104). The application related to information exchange may, for example, include a notification relay application for relaying specific information to the external electronic device, or a device management application for managing the external electronic device.

For example, the notification relay application may include a function of relaying notification information, which is generated in another application (e.g., an SMS/MMS application, an E-mail application, a healthcare application, an environmental information application or the like) of the electronic device 101, to the external electronic device (e.g., the electronic device 104). Additionally or alternatively, the notification relay application may, for example, receive notification information from the external electronic device (e.g., the electronic device 104) and provide the received notification information to the user. The device management application may, for example, manage (e.g., install, delete or update) a function (e.g., a function of turning on/off the external electronic device itself (or some components) or adjusting the display's brightness (or resolution)) for at least a part of the external electronic device (e.g., the electronic device 104) that communicates with the electronic device 101, and/or manage an application operating in the external electronic device or a service (e.g., a call service or a message service) provided from the external electronic device.

In accordance with various embodiments of the present disclosure, the application(s) 134 may include an application that is specified depending on the properties (e.g., the type of the electronic device) of the external electronic device (e.g., the electronic device 104). For example, if the external electronic device is a digital audio player, the application(s) 134 may include an application related to music playback. Similarly, if the external electronic device is a mobile medical device, the application(s) 134 may include an application related to healthcare. In accordance with an embodiment of the present disclosure, the application(s) 134 may include at least one of an application specified in the electronic device 101 and an application received from the external electronic device (e.g., a server 106 or the electronic device 104).

The I/O interface 140 may deliver the command or data that is received from the user through an input/output device (e.g., a sensor, a keyboard or a touch screen), to the processor 120, the memory 130, the communication interface 160 or the input processing module 170 through, for example, the bus 110. For example, the I/O interface 140 may provide, to the processor 120, the data for a user's touch that is made on a touch screen. The I/O interface 140 may, for example, output the command or data that is received from the processor 120, the memory 130, the communication interface 160 or the input processing module 170 via the bus 110, through an input/output device (e.g., a speaker or a display). For example, the I/O interface 140 may output the voice data processed by the processor 120 to the user through the speaker.

The display 150 may display a variety of information (e.g., multimedia data, text data or the like), for the user.

The communication interface 160 may connect communication between the electronic device 101 and the external device (e.g., the electronic device 104 or the server 106). For example, the communication interface 160 may be connected to a network 162 through wired communication or wireless communication to communicate with the external device. The wireless communication may, for example, include at least one of Wireless Fidelity (WiFi), Bluetooth (BT), Near Field Communication (NFC), Global Positioning System (GPS), and cellular communication (e.g., Long Term Evolution (LTE), Long Term Evolution-Advanced (LTE-A), Code Division Multiple Access (CDMA), Wideband Code Division Multiple Access (WCDMA), Universal Mobile Telecommunications System (UMTS), Wireless Broadband (WiBro), Global System for Mobile communications (GSM), or the like). The wired communication may, for example, include at least one of Universal Serial Bus (USB), High Definition Multimedia Interface (HDMI), Recommended Standard 232 (RS-232), and Plain Old Telephone Service (POTS).

In accordance with an embodiment of the present disclosure, the network 162 may be a telecommunications network. The communications network may include at least one of the computer network, the internet, the internet of things, and the telephone network. In accordance with an embodiment of the present disclosure, a protocol (e.g., a transport layer protocol, a data link layer protocol or a physical layer protocol) for communication between the electronic device 101 and the external device may be supported in at least one of the application(s) 134, the API 133, the middleware 132, the kernel 131 or the communication interface 160.

In accordance with an embodiment of the present disclosure, the server 106 may support driving of the electronic device 101 by performing at least one of the operations (or functions) implemented in the electronic device 101. For example, the server 106 may include an input processing server module 108 capable of supporting the input processing module 170 implemented in the electronic device 101. For example, the input processing server module 108 may include at least one component of the input processing module 170 to perform (e.g., perform on behalf of the input processing module 170) at least one of the operations performed by the input processing module 170. In accordance with an embodiment of the present disclosure, at least one component of the input processing module 170 may be included in the server 106 (e.g., the input processing server module 108), and at least one operation implemented in the input processing module 170 may be supported by the server 106.

The input processing module 170 may process at least some of the information obtained from other components (e.g., the processor 120, the memory 130, the I/O interface 140, the display 150, the communication interface 160, or the like), and provide the processed information to the user in various ways. For example, the input processing module 170 may control the display 150 based on the input (e.g., a user input) obtained through the display 150, using or independently of the processor 120.

For example, the input processing module 170 may change the display's reference axis for processing the user input, based on the user input obtained through at least the interface. The input processing module 170 may execute an event corresponding to the user input on the external device (e.g., the electronic device 104 or the server 106) for the electronic device 101 based on the changed reference axis. Additional information about the input processing module 170 may be provided by the input processing module 170 in FIG. 2 described below.

Figure 2:
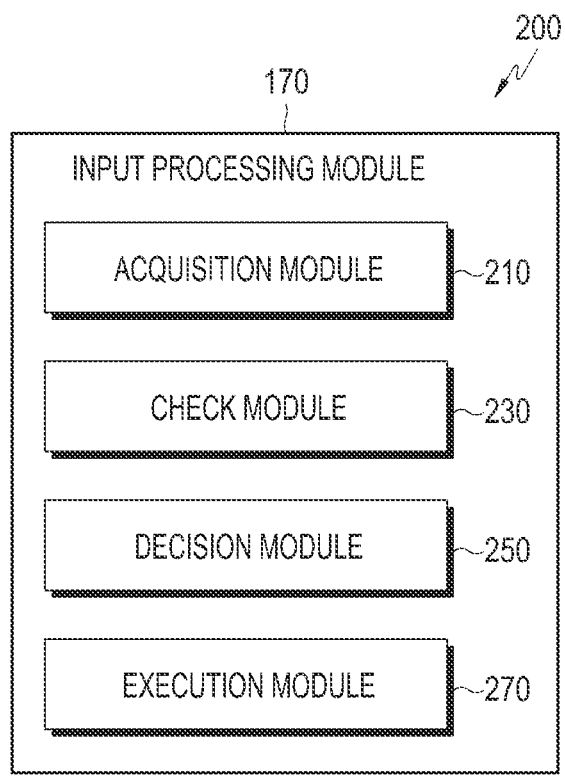
FIG. 2 illustrates a structure of an input processing module of an electronic device according to various embodiments of the present disclosure.

FIG. 2 illustrates a structure 200 of the input processing module 170 of the electronic device 101 according to various embodiments of the present disclosure.

Referring to FIG. 2, the input processing module 170 may include an acquisition module 210, a check module 230, a decision module 250, and an execution module 270.

The acquisition module 210 may, for example, determine whether a user input obtained through a display (e.g., the display 150) that is functionally connected to an electronic device (e.g., the electronic device 101) is a user input (hereinafter, referred to as an 'execution input' for convenience of description) for controlling (e.g., remotely controlling) the external device (e.g., the electronic device 104 or the server 106) for the electronic device 101. In accordance with an embodiment of the present disclosure, the acquisition module 210 may obtain (e.g., detect), as a user input, a touch input that is made as an external object (e.g., a part of the user's body, an electronic pen, or the like) for the electronic device is directly in contact with a display (e.g., a touch screen with a touch panel), or a hovering input that is made in a position that is far from the display by a specified distance.

In accordance with an embodiment of the present disclosure, the acquisition module 210 may determine whether the user input is an execution input for controlling (e.g., performing an event corresponding to the user input on the external device) the external device, based on the moving distance corresponding to the user input. For example, the acquisition module 210 may obtain a user input of making a drag (e.g., a drag based on touch or hovering) from at least one point (hereinafter, referred to as a 'start point' for convenience of description) of the display to another point (hereinafter, referred to as an 'end point' for convenience of description). If a distance (e.g., a moving distance of the user input) between the start point and the end point of the user input includes or is within a specified distance (e.g., a distance of about 1 cm, which is set to determine whether the user input is an execution input) (e.g., if the moving distance of the user input is about 2 cm), the acquisition module 210 may determine the user input as an execution input.

On the other hand, if the distance between the start point and the end point of the user input is less than the specified distance (e.g., if the distance is about 0.5 cm), the acquisition module 210 may determine that the user input is not an execution input. For example, if the moving distance of the user input is within a specified range (e.g., a range belonging to a distance shorter than the specified distance), the acquisition module 210 may disregard the user input (e.g., disregard the user input so that an event may not be executed on the external device by the user input).

For example, if the moving distance of the user input corresponds to a specified range (e.g., a range that is hard to determine whether the user input is an execution input), the acquisition module 210 may execute an event (e.g., execution of an application stored in the electronic device 101, or brightness adjustment, volume adjustment or muting for the electronic device 101) corresponding to the user input not on the external device, but on the electronic device (e.g., the electronic device 101) that has obtained the user input. Alternatively, the acquisition module 210 may not perform any operation corresponding to the user input on the external device or the electronic device 101.

In accordance with an embodiment of the present disclosure, the acquisition module 210 may determine whether the user input includes a plurality of execution inputs, based on at least one of the moving distance and the moving direction of the user input. For example, if the user input includes a plurality of specified distances (e.g., distances preset to determine the user input as an execution input), the acquisition module 210 may designate (or determine) an input corresponding to each of the plurality of specified distances as an independent execution input. For example, if a specified distance for determining whether the user input is an execution input is about 1 cm and a moving distance (e.g., a dragged moving distance) of the user input is about 3 cm to 4 cm, the acquisition module 210 may obtain a total of 3 independent execution inputs through one user input of dragging the display.

In accordance with an embodiment of the present disclosure, if the user input has a plurality of moving directions, the acquisition module 210 may obtain, as an independent execution input, a user input corresponding to each moving direction (e.g., a left-to-right drag, a top-to-bottom drag, a bottom-to-top drag or the like on the display). For example, if the user input has continuously moved rightward, downward and upward, the acquisition module 210 may determine whether each moving direction includes a specified distance. If a moving distance corresponding to each moving direction includes a specified distance, the acquisition module 210 may obtain an input corresponding to each moving direction as an execution input. In this case, if at least one of a plurality of moving directions does not include a specified distance, the acquisition module 210 may disregard an input corresponding to the moving direction that does not include the specified distance.

In accordance with an embodiment of the present disclosure, the acquisition module 210 may determine user inputs obtained in different areas on the display as different user inputs. For example, the acquisition module 210 may obtain, as independent user inputs, a first input made by dragging a first area on the display and a second input made by dragging a second area. An additional description of the acquisition module 210 according to an embodiment of the present disclosure will be made in conjunction with FIG. 3 further below.

In accordance with an embodiment of the present disclosure, if a plurality of execution inputs are obtained through one user input (e.g., a user input having one start point and one end point), the respective modules of the input processing module 170 may independently process the plurality of execution inputs in cooperation with each other. For example, the input processing module 170 may determine a reference axis for each of the plurality of execution inputs, and perform an event corresponding to each of the plurality of execution inputs on the external device (e.g., the electronic device 104 or the server 106) based on its associated reference axis. Detailed operations thereof will be performed in associated modules. Although examples of the specified distances and the specified ranges are described as specific numeral values in the foregoing description, the specified distances and the specified ranges are not limited to the aforementioned examples, and are subject to change depending on the user's settings or the designer of the electronic device.

The check module 230 may, for example, check an angle for the user input (e.g., the user input determined as an execution input) based on a reference axis for a display (e.g., the display 150). In accordance with an embodiment of the present disclosure, in order to process the user input, the check module 230 may determine an angle between the reference axis and the moving direction corresponding to the user input by defining an axis (hereinafter, referred to as a 'temporary axis' for convenience of description) that is temporarily set on the display, as the reference axis. The temporary axis may be freely changed depending on, for example, the user's designation (e.g., the user's settings), or may include an axis that is set by default during implementation by the designer of the electronic device. Otherwise, the temporary axis may be the reference axis that is determined to process the user input (e.g., a previous execution input) that has been made in advance of the user input to be currently processed.

In accordance with an embodiment of the present disclosure, if the execution inputs obtained by the acquisition module 210 are plural in number, the check module 230 may determine an angle for each of the plurality of execution inputs by defining the temporary axis as a reference axis. For example, if a first execution input and a second execution input are obtained through one user input, the check module 230 may determine an angle for the first execution input and an angle for the second execution input based on the temporary axis.

In accordance with an embodiment of the present disclosure, a plurality of execution inputs are obtained in different areas on the display by the acquisition module 210, the check module 230 may determine an angle for each of the plurality of execution inputs by defining the temporary axis of its associated area as a reference axis. For example, for a first input obtained in a first area on the display, the check module 230 may determine an angle corresponding to the first input by defining a temporary axis of the first area as a reference axis. For a second input obtained in a second area on the display, the check module 230 may determine an angle corresponding to the second input by defining a temporary axis of the second area as a reference axis. An additional description of the check module 230 according to an embodiment of the present disclosure will be made in conjunction with FIG. 3 further below.

The decision module 250 may, for example, determine a new axis (hereinafter, referred to as a 'changed axis' for convenience of description) as the reference axis based on the angle (e.g., an angle corresponding to the user input, which is determined by defining the temporary axis as a reference axis) corresponding to at least the user input. In accordance with an embodiment of the present disclosure, the decision module 250 may determine the changed axis based on the range to which the angle (e.g., the range between the temporary axis and the moving direction of the execution input) belongs. For example, if the angle is within a first specified range, the decision module 250 may determine the changed axis by increasing or decreasing an angle of the temporary axis by a first angle. If the angle is within a second specified range, the decision module 250 may determine the changed axis by increasing or decreasing an angle of the temporary axis by a second angle.

For example, if the angle between the user input determined as an execution input by the check module 230 and the temporary axis is about 10°, the decision module 250 may determine, as a changed axis, the axis that is changed (e.g., tilted or rotated) by increasing or decreasing an angle of the temporary axis by about 10°. If the angle between the temporary axis and the user input is about 20°, the decision module 250 may determine, as a changed axis, the axis that is changed by increasing or decreasing an angle of the temporary axis by about 20°. In accordance with an embodiment of the present disclosure, if the angle is within a specified range (e.g., about +/−5°), the decision module 250 may determine the temporary axis as the changed axis. For example, if the angle is determined as an angle of, for example, 2°, the decision module 250 may keep the temporary axis as a reference exists.

In accordance with an embodiment of the present disclosure, the decision module 250 may determine a changed axis for each of the plurality of execution angles. For example, if a first execution input and a second execution input are obtained through one user input, the decision module 250 may determine a changed axis corresponding to the first execution input based on the angle between the first execution input and the temporary axis. In addition, the decision module 250 may determine a new changed axis corresponding to the second execution input based on the angle between the second execution input and the changed axis that is determined in response to the first execution input.

In accordance with another embodiment of the present disclosure, the decision module 250 may determine one changed axis for a plurality of execution inputs. For the first execution input and the second execution input obtained by the acquisition module 210, the decision module 250 may determine a changed axis using a variable (e.g., an average of two angles) that is determined based on the angle between the first execution input and the temporary axis and the angle between the second execution input and the temporary axis. As another example, if the first execution input and the second execution input have the same or similar direction through one user input, the decision module 250 may determine one changed axis.

In accordance with various embodiments of the present disclosure, the decision module 250 may determine a changed axis using an average of angles of last N user inputs (where N is an integer) having the same or similar direction. For example, for an (N+1)-th user input having the same or similar direction, the decision module 250 may determine a changed axis using an average of an angle $\alpha 1$ of an (N−1)-th user input, an angle $\alpha 2$ of an N-th user input and an angle $\alpha 3$ of the (N+1)-th user input.

In accordance with an embodiment of the present disclosure, the decision module 250 may determine a changed axis corresponding to each of a plurality of execution inputs that are obtained in different areas on the display. For example, the plurality of execution inputs may include a first execution input obtained in a first area (e.g., a left area) on the display and a second execution input obtained in a second area (e.g., a right area) on the display. In this case, the decision module 250 may determine a first changed axis corresponding to the first execution input based on the angle of the first execution input, which is determined based on the temporary axis of the first area. The decision module 250 may determine a second changed axis corresponding to the second execution input based on the angle of the second execution input, which is determined based on the temporary axis of the second area.

The execution module 270 may, for example, execute an event corresponding to the user input through an external device (e.g., the electronic device 104 or the sever 106) that is functionally connected to the electronic device 101, based on the reference axis (e.g., the changed axis determined based on the angle of the user input, or the temporary axis that has remained unchanged). In accordance with an embodiment of the present disclosure, the execution module 270 may execute an event (e.g., volume adjustment, channel switching, brightness adjustment, screen flipping, cursor shifting, or the like) corresponding to the moving direction (e.g., up, down, left, right or the like) of the user input (e.g., a user input determined as an execution input) that is determined based on the reference axis. For example, if it is determined that the user input has moved in the left direction on the display at an angle of about 80° with respect to the reference axis (e.g., the X axis) (e.g., if the user input has moved in a diagonal direction close to the Y axis on the display), the execution module 270 may control the external device so that the sound that is output from the external device may increase.

As another example, if it is determined that the user input has moved in the right direction on the display at an angle of about 30° with respect to the reference axis (e.g., the X axis) (e.g., if the user input has moved in a diagonal direction close to the X axis on the display), the execution module 270 may control the external device so that a channel (e.g., a TV channel if the external device provides TV broadcast) that is output from the external device may be switched.

In accordance with an embodiment of the present disclosure, if it is determined that the user input includes a plurality of execution inputs, the execution module 270 may continuously execute an event corresponding to each of the plurality of execution inputs. For example, the plurality of execution inputs may include a first execution input of dragging the display from left to right, a second execution input of dragging the display from right to left, and a third execution input of dragging the display from bottom to top, based on the reference axis that is determined by the decision module 250 among the temporary axis and the changed axis. In this case, the execution module 270 may continuously perform a Volume-Up event corresponding to the first execution input, a Volume-Down event corresponding to the second execution input, and a Channel Switching event corresponding to the third execution input. In accordance with an embodiment of the present disclosure, a plurality of execution inputs may be obtained through one user input (e.g., a user input having one start point and one end point), or may be obtained through a plurality of user inputs, which have been made independently.

In accordance with an embodiment of the present disclosure, the execution module 270 may execute an event for each of the plurality of inputs that are obtained in different areas on the display. For example, for a first input that is obtained in a left area on the display, the execution module 270 may execute an event based on a first reference axis corresponding to the first input. For a second input that is obtained in a right area on the display, the execution module 270 may execute an event based on a second reference axis corresponding to the second input.

In accordance with an embodiment of the present disclosure, the execution module 270 may deliver events corresponding to the first input and the second input to different external devices, respectively. For example, the execution module 270 may control a first external device (e.g., a TV) that is functionally connected to the electronic device 101, for the event corresponding to the first input, and control a second external device (e.g., a smart phone) that is functionally connected to the electronic device 101, for the event corresponding to the second input.

In accordance with an embodiment of the present disclosure, the execution module 270 may deliver a control signal (e.g., a control signal corresponding to an event) for controlling an external device to the external device so that the event corresponding to the user input may be executed on the external device (e.g., a TV that is wirelessly connected to the electronic device). For example, the execution module 270 may deliver, to the external device, an event (e.g., event information or a control signal corresponding to the event) corresponding to an execution input (e.g., an input of dragging the display from bottom to top on the display by a specified distance (e.g., about 2 cm) or more) obtained in the electronic device (e.g., the electronic device 101). Accordingly, the external device may execute the event corresponding to the user input obtained in the electronic device.

In accordance with an embodiment of the present disclosure, the execution module 270 may provide notification information corresponding to the event to at least one of the output devices that are functionally connected to the electronic device and the external device. For example, if an event occurs or an event is received at the external device in response to a user input, the execution module 270 may display notification (e.g., cursor shifting, screen switching, brightness adjustment for the display, or screen blinking) of the event on the display of the electronic device or the external device. Also, the execution module 270 may provide a variety of information associated with the event to the user by outputting the sound through a speaker of the electronic device or the external device, by outing vibrations through a vibration device and/or, by outputting light though a light emitting device.

Figure 3:
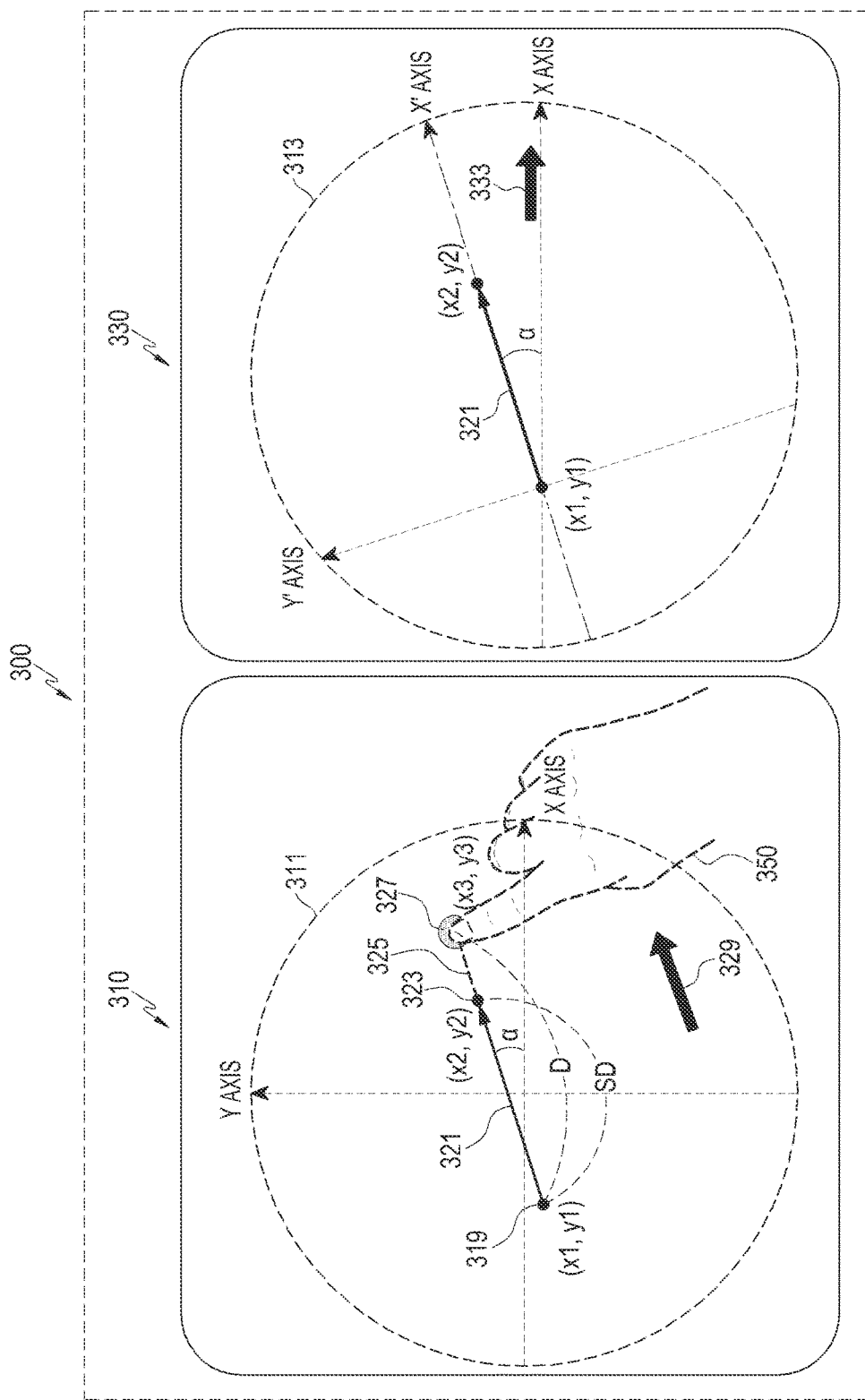
FIG. 3 illustrates an example of a change in reference axis associated with an electronic device according to various embodiments of the present disclosure.

FIG. 3 illustrates an example 300 of a change in reference axis associated with an electronic device (e.g., the display 150) according to various embodiments of the present disclosure. For example, on a display 310 (e.g., the display 150) is illustrated a first coordinate axis 311 that includes the X axis and the Y axis, and on a display 330 is illustrated a second coordinate axis 313 that includes the X' axis and the Y' axis which are changed from the X axis and the Y axis based on a user input 325. Although the first coordinate axis 311 and the second coordinate axis 313 are independently illustrated on the separate displays in FIG. 3 for convenience of description, the first coordinate axis 311 and the second coordinate axis 313 are not separated on the separate displays in fact. For example, FIG. 3 shows that a reference axis of one display can be changed in order to process a user input obtained through the display.

The temporary axis and the changed axis may be, for example, any one of two axes (e.g., the X axis and the Y axis in the case of the first coordinate axis 311) constituting a coordinate axis. For example, the temporary axis may be determined as any one (e.g., the X axis) of the X axis and the Y axis based on the user input 325. For example, a distance between the coordinates (x1, y1) of a start point 319 of the user input 325 and the coordinates (x3, y3) of an end point 327 of the user input 325 may include the shortest distance (e.g., a distance of about 5 cm between x3 and x1) in the X-axis direction and the shortest distance (e.g., a distance of about 1 cm between y3 and y1) in the Y-axis direction. In this case, the temporary axis may, for example, be determined as an axis (e.g., X axis) corresponding to a longer one of the shortest distance in the X-axis direction and the shortest distance in the Y-axis direction.

In accordance with an embodiment of the present disclosure, the temporary axis may be determined as any one of the X axis and the Y axis based on the angle between the X axis and the user input 325 and the angle between the Y axis and the user input 325. For example, the temporary axis may be determined as an axis having a smaller one of the angle between the X axis and the user input 325 and the angle between the Y axis and the user input 325. For example, if an angle α between the user input 325 and the X axis is less than about 45° and an angle between the user input 325 and the Y axis is greater than about 45°, the temporary axis may be determined as the X axis. On the other hand, if the angle α between the X axis and the user input 325 is greater than about ½ (about 45°) of the angle between the X axis and the Y axis, the temporary axis may be determined as the Y axis. If the X axis is selected as a temporary axis, the changed axis may be referred to as, for example, an X' axis. In this case, consideration of the Y' axis corresponding to the Y axis may be omitted. In accordance with an embodiment of the present disclosure, the first coordinate axis 311 and the second coordinate axis 313 may be virtual coordinate axes which are not actually displayed (e.g., which cannot be visually recognized by the user, or cannot be seen by the user) on the displays 310 and 330. The first coordinate axis 311 and the second coordinate axis 313 may, for example, be displayed on the displays 310 and 330 as user interfaces depending on the settings by the user or the designer.

In accordance with an embodiment of the present disclosure, the display 310 (e.g., the display 150) may obtain the user input 325 from a user (e.g., the user's finger) 350. The user input 325 may be, for example, an input of dragging the display 310 from the start point 319 (e.g., coordinates (x1, y1)) to the end point 327 (e.g., coordinates (x3, y3)). In this case, the user input 325 may, for example, include coordinates (x2, y2), which correspond to an arbitrary point (hereinafter, referred to as a 'reference point' for convenience of description) that is away from the start point 319 by a specified distance SD. The specified distance SD may be a reference distance for determining whether the user input 325 is an execution input for executing an event on the external device.

In accordance with an embodiment of the present disclosure, a moving direction 329 of the user input 325 may be, for example, a diagonal direction in which the user input 325 moves to the upper right side on the display 310 at an angle α with respect to the X axis. In this case, the angle α between the user input 325 and the X axis is less than the angle between the user input 325 and the Y axis and the shortest X-axis distance of the user input 325 is greater than the shortest Y-axis distance, so the temporary axis may, for example, be determined as the X axis. In accordance with an embodiment of the present disclosure, if the user input 325 includes the specified distance SD, the electronic device (e.g., the check module 230) may obtain a vector 321 connecting the start point 319 to an end point 323, as an execution input. The vector 321 may, for example, include the specified distance SD and the moving direction 329 of the user input 325. In accordance with an embodiment of the present disclosure, if the user input 325 includes a plurality of specified distances SD, the electronic device (e.g., the check module 230) may determine every specified distance SD as an independent execution input. Although not illustrated, if a moving distance D of the user input 325 is less than the specified distance SD, the electronic device may disregard the user input.

In accordance with an embodiment of the present disclosure, the specified distance SD may be a value that is set in advance by the manufacturer, or may be changed by the user's settings. In accordance with an embodiment of the present disclosure, the electronic device may differently apply the specified distance SD depending on the moving direction of the user input 325. For example, for the user input 325 (e.g., a drag) in the left or right direction (e.g., about +/−45° with respect to the X axis 315) based on the first coordinate axis 311, the electronic device (e.g., the acquisition module 210) may obtain an execution input based on a first specified distance (e.g., about 1.5 cm). For the user input 325 in the up or down direction (e.g., about +/−45° with respect to the Y axis among reference axes) based on the first coordinate axis 311, the electronic device (e.g., the acquisition module 210) may obtain an execution input based on a second specified distance (e.g., about 1.7 cm).

In accordance with an embodiment of the present disclosure, the electronic device (e.g., the decision module 250) may determine a changed axis (e.g., the X' axis) based on the angle between the user input 325 (e.g., the vector 321) and the X axis which is a temporary axis. For example, if the angle between the vector 321 and the X axis which is a temporary axis is about +10° (e.g., about 10° in the counterclockwise direction), the electronic device (e.g., the decision module 250) may determine the X' axis, which is defined by tilting the X axis in a positive (+) direction (e.g., the counterclockwise direction) by about 10°, as a changed axis (e.g., a new reference axis).

In accordance with an embodiment of the present disclosure, the electronic device (e.g., the execution module 270) may execute an event corresponding to the user input 325 on the external device (e.g., the electronic device 104) based on the X' axis which is the changed axis. The event may, for example, correspond to a moving direction 333 that is defined by modifying the moving direction 329 of the user input 325 based on the X' axis. For example, the moving direction 329 of the user input 325 is a diagonal direction in which the user input 325 moves to the upper right side on the display 310, so the event corresponding to the moving direction 329 may not be checked by the electronic device (e.g., the check module 230). However, as the moving direction 329 is determined as the moving direction 333, which is the right direction on the display 330, based on the X' axis, the electronic device (e.g., the execution module 270) may execute the event (e.g., brightness adjustment for the display of the external electronic device) corresponding to the moving direction 333.

Figure 4:
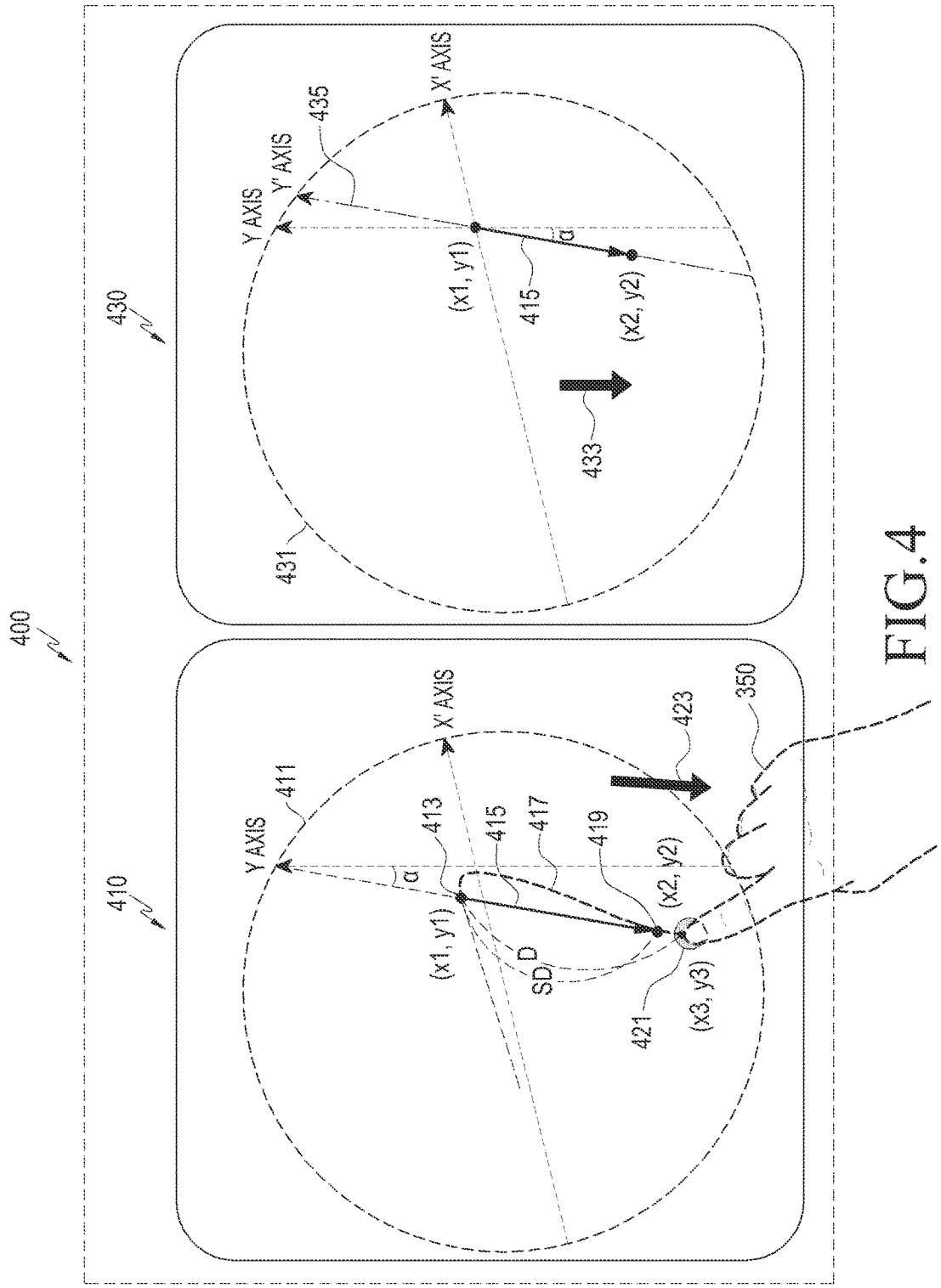
FIG. 4 illustrates another example of a change in reference axis associated with an electronic device according to various embodiments of the present disclosure.

FIG. 4 illustrates another example 400 of a change in reference axis associated with an electronic device (e.g., the display 150) according to various embodiments of the present disclosure. Throughout FIG. 4, a description of the same or similar parts as/to those in FIG. 3 will be omitted.

In accordance with an embodiment of the present disclosure, a display 410 (e.g., the display 310) may obtain a user input 417 from the user (e.g., the user's finger) 350. The user input 417 may be, for example, an input of dragging the display 410 from a start point 413 (e.g., coordinates (x1, y1)) to an end point 421 (e.g., coordinates (x3, y3)). In this case, the user input 417 may, for example, include coordinates (x2, y2), which correspond to a reference point 419 that is away from the start point 413 by a specified distance SD.

In accordance with an embodiment of the present disclosure, the user input 417 may include an input (hereinafter, referred to as a 'continuous input' for convenience of description) (e.g., in which the finger of the user 350 continuously touches or hovers the display 410), which continues from the previous user input (e.g., the user input 325). In this case, the electronic device (e.g., the acquisition module 210) may designate (or determine) the reference point 323 of the user input 325 as a start point 413 of the continuous input 417.

In accordance with an embodiment of the present disclosure, the continuous input 417 may be obtained, as its moving direction is changed from the moving direction (e.g., the moving direction 329) of the previous user input (e.g., the user input 325) to another moving direction 423. The moving direction 423 may be, for example, a diagonal direction in which the user input 417 moves to the lower left side based on the X' axis which is the previous reference axis (e.g., the previous changed axis). The electronic device (e.g., the acquisition module 210) may determine whether a moving distance D of the continuous input 417 includes a specified distance SD.

If the moving distance D of the continuous input 417 includes the specified distance SD, the electronic device (e.g., the acquisition module 210) may obtain, as an execution input, a vector 415 that connects the start point 413 of the continuous input 417 to the reference point 419 that is away from the start point 413 by the specified distance SD. In accordance with an embodiment of the present disclosure, the electronic device (e.g., the check module 230) may determine a temporary axis using the vector 415. For example, a coordinate axis 411 of the display 410 may include the X' axis which is the previous changed axis, and the Y axis which was not considered in the previous user input (e.g., the user input 325). The electronic device (e.g., the check module 230) may determine any one of the X' axis and the Y axis as a temporary axis for processing the continuous input 417, based on the angle between the vector 415 and the X' axis or the angle between the vector 415 and the Y axis. For example, an angle between the continuous input 417 and the X' axis may be greater than an angle α between the continuous input 417 and the Y axis. In this case, the X'-axis shortest distance of the continuous input 417 may be shorter than the Y-axis shortest distance of the continuous input 417. Accordingly, the electronic device may determine the Y axis as a temporary axis in the coordinate axis 411 including the X' axis and the Y axis.

In accordance with an embodiment of the present disclosure, the electronic device (e.g., the decision module 250) may determine a changed axis for determining an event for the continuous input 417, based on the angle α between the vector 415 and the Y axis which is the temporary axis. For example, the electronic device (e.g., the decision module 250) may determine, as a changed axis, the Y' axis 435 which is changed from the temporary axis by a value corresponding to the angle α. For example, if the angle between the vector 415 and the Y axis which is the temporary axis is about +10° (e.g., about 10° in the counterclockwise direction), the electronic device (e.g., the decision module 250) may determine the Y' axis, which is defined by tilting the Y axis in a positive (+) direction (e.g., the counterclockwise direction) by about 10°, as a changed axis. In FIG. 4, the Y' axis which is the changed axis may be determined, as the Y axis rotates in the center of the coordinate axis 411 by the angle α.

Accordingly, a coordinate axis 431 of a display 430 may, for example, include the X' axis and the Y' axis. Although not illustrated, since the X' axis of the coordinate axis 431 is not considered, as to the axis corresponding to the X-axis direction of the coordinate axis 431, the X axis (e.g., the X axis in FIG. 3) may be maintained intact. In accordance with an embodiment of the present disclosure, the electronic device (e.g., the execution module 270) may execute an event 433 corresponding to the continuous input 417 (e.g., the vector 415) based on the reference axis (e.g., the Y' axis 435 which is the changed axis).

In accordance with an embodiment of the present disclosure, the electronic device (e.g., the execution module 270) may execute an event corresponding to the continuous input 417 on the external device (e.g., the electronic device 104), based on the Y' axis or the changed axis. The event may, for example, correspond to the moving direction 433 defined by modifying the moving direction 423 of the continuous input 417 based on the Y' axis. For example, the moving direction 423 of the continuous input 417 is a diagonal direction in which the continuous input 417 moves to the lower left side on the display 410, so the event corresponding to the moving direction 423 may not be checked by the electronic device (e.g., the check module 230). However, as the moving direction 423 is determined as the moving direction 433, which is the down direction on the display 430, based on the Y' axis, the electronic device (e.g., the execution module 270) may execute the event (e.g., brightness adjustment for the display of the external electronic device) corresponding to the moving direction 433.

In accordance with an embodiment of the present disclosure, although the continuous input 417 includes the moving distance D and the moving direction 423, an execution input corresponding to the continuous input 417 may be the vector 415 that is different from the moving distance D. For example, an execution input corresponding to the user input (e.g., the user inputs 325 and 417) may be obtained differently from the actual moving distance depending on the specified distance SD. In accordance with an embodiment of the present disclosure, the user or the manufacturer of the electronic device may set the sensitivity for the user input that is made on the display 150, by adjusting the specified distance SD which is a criterion for determining an execution input.

For example, as the specified distance SD is set shorter, the electronic device (e.g., the check module 230) may more sensitively respond (e.g., may obtain more execution inputs) to the continuous input 417 that is made on the displays 410 and 430. For example, the moving distance D of the user input (e.g., the user inputs 325 and 417) may be about 4 cm. If the specified distance SD is about 1 cm, the electronic device may execute 4 events by obtaining 4 execution inputs. On the other hand, as the specified distance SD is set larger, the electronic device may less sensitively respond (e.g., may obtain less execution inputs) to the continuous input 417 that is made on the displays 410 and 430. For example, if the specified distance SD is about 2 cm, the electronic device may execute 2 events by obtaining 2 execution inputs.

Figure 5:
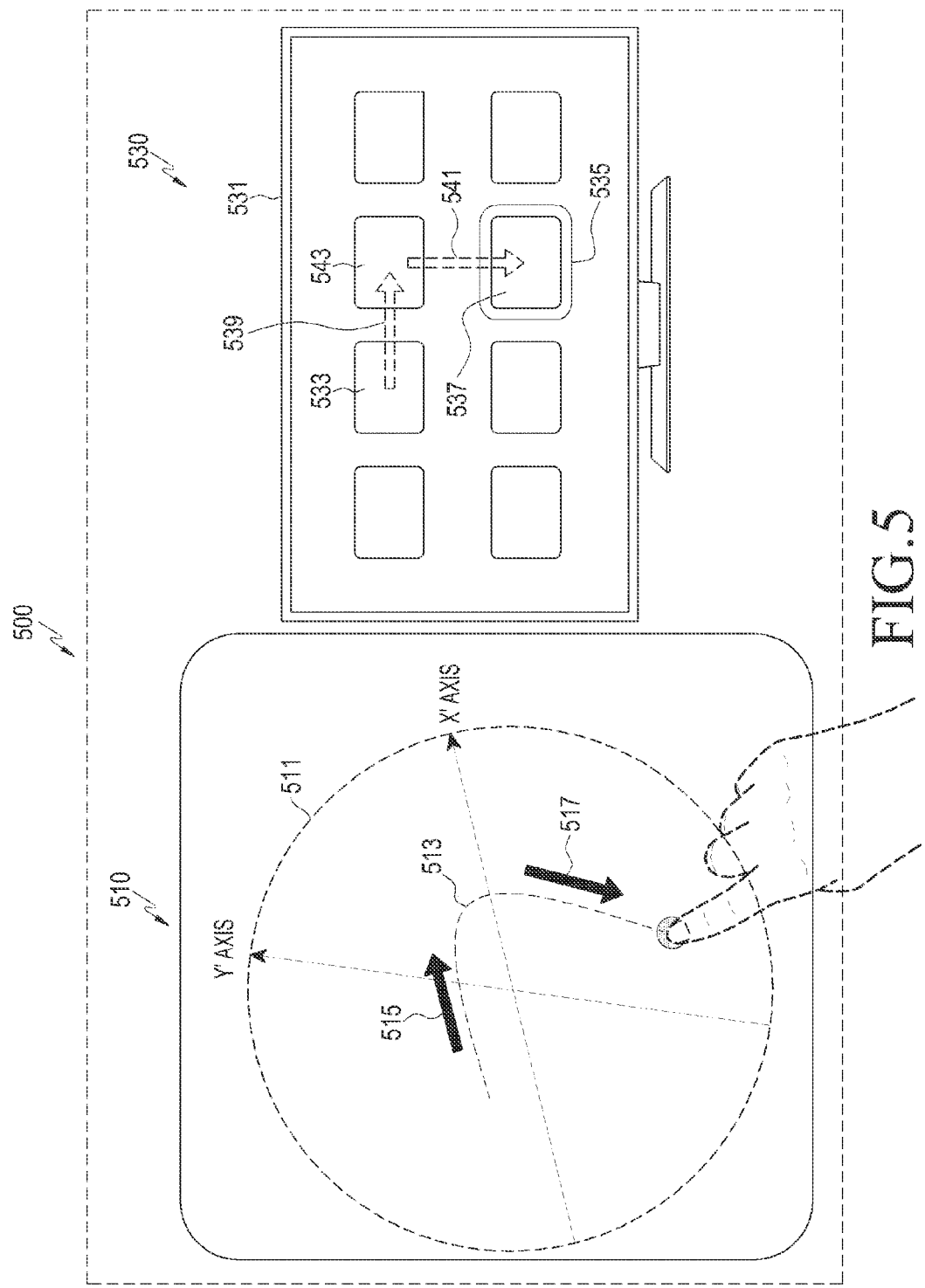
FIG. 5 illustrates an example of performing an event corresponding to a user input according to various embodiments of the present disclosure.

FIG. 5 illustrates an example 500 of performing an event corresponding to a user input (e.g., user inputs 325 and 417) according to various embodiments of the present disclosure. A display 510 (e.g., the display 150) may obtain a user input 513 from the user 350.

For example, the user input 513 may include a first movement 515 (e.g., in a first moving direction) and a second movement 517 (e.g., in a second moving direction), each of which includes a specified distance SD. The electronic device (e.g., the acquisition module 210) may obtain the first movement 515 and the second movement 517 as a first execution input and a second execution input, respectively. In accordance with an embodiment of the present disclosure, the electronic device (e.g., the execution module 270) may execute events corresponding to the first execution input and the second execution input, based on a coordinate axis 511 that is determined depending on the continuous first and second execution inputs. For example, the electronic device may execute a first event based on the X' axis, which is a reference axis corresponding to the first execution input. The electronic device may execute a second event based on the Y' axis, which is a reference axis corresponding to the second execution input.

In accordance with an embodiment of the present disclosure, the electronic device (e.g., the execution module 270) may move a marker 535 from a first object 533 (e.g., an icon corresponding to an interface, a menu or an application of an external device) to a second object 537 on a display 531 that is functionally connected to an external device 530 (e.g., a TV). For example, the electronic device may move the marker 535 from the first object 533 to a given object 543 along a first direction 539 on the display 531, in response to the first execution input that moves in the right direction on the display 510 based on the X' axis. The electronic device may move the marker 535 from the given object 543 to the second object 537 along a second direction 541 on the display 531, in response to the second execution input that moves in the down direction on the display 510 based on the Y' axis.

In accordance with an embodiment of the present disclosure, the external device may perform an operation corresponding to the event received from the electronic device depending on the function currently being executed. For example, if a media content function is being executed in the external device, the external device may execute an event (e.g., Rewind, Fast Forward, Next Play List, Volume Adjustment, Skip, or the like) associated with the media content function depending on a first execution input and a second execution input obtained in the electronic device. If a gallery (or photo album) function is being executed in the external device, the external device may execute an event (e.g., Next Photo, Previous Photo, Select Photo, Move between Photos, or the like) associated with the gallery function being executed, depending on the execution inputs obtained in the electronic device.

An embodiment illustrated in FIG. 5 is to provide an example of executing an event for a continuous user input (e.g., a continuous input). In accordance with an embodiment of the present disclosure, even if the first movement 515 and the second movement 517 are independently obtained not through one user input, but through a plurality of user inputs, the electronic device may execute an event corresponding to each of the independent user inputs. For example, after the first movement 515, the user 350 may make the second movement 517 by touching (or hovering) again the display 510 after releasing the touch (or hovering) on the display 510. In this case, the electronic device may execute an event corresponding to a first execution input that has occurred in response to the first movement 515, and then, execute an event corresponding to a second execution input that has occurred in response to the second movement 517, in an independent way.

In accordance with an embodiment of the present disclosure, the electronic device may process the second execution input made by the second movement 517 based on the reference axis (e.g., the Y' axis) that was determined to process the first execution input made by the first movement 515. For example, the electronic device may continuously execute an event corresponding to the next user input by storing, in the memory (e.g., the memory 130), the coordinate axis that is determined to process the previous user input.

For example, after termination of the application which was being executed at the time the first execution input was made, if the application is re-executed and the second execution input is made, the electronic device may process the second execution input based on the reference axis that was determined to process the first execution input. In accordance with an embodiment of the present disclosure, the changed reference axis may be automatically reset as a default coordinate axis (e.g., the coordinate axis 311) upon lapse of the predetermined time that is set by the electronic device (e.g., the processor 120) or the manufacturer. Otherwise, the changed reference axis may be manually reset as a default coordinate axis at the request of the user.

Figure 6:
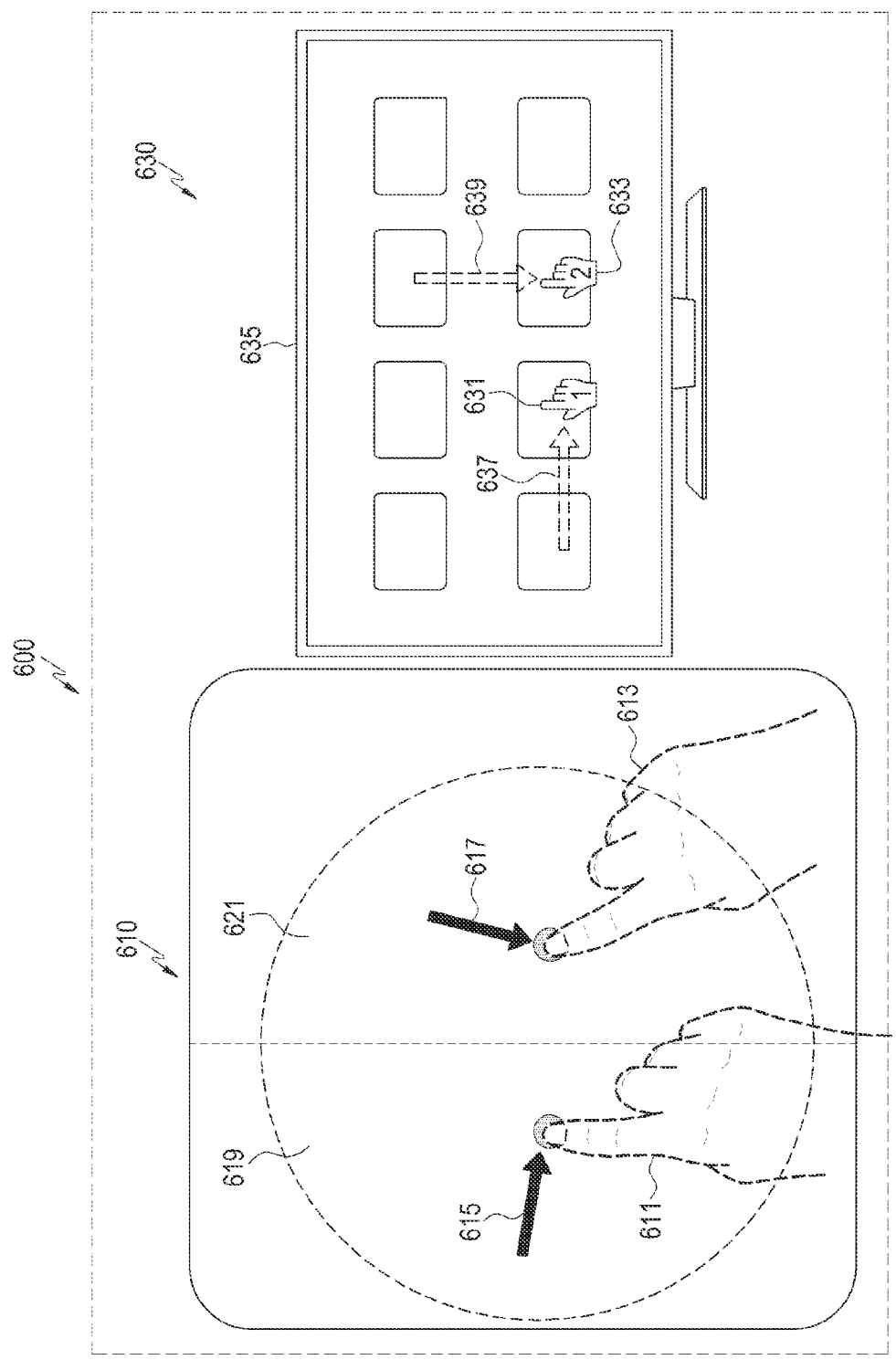
FIG. 6 illustrates another example of performing an event corresponding to a user input on an electronic device according to various embodiments of the present disclosure.

FIG. 6 illustrates another example 600 of performing an event corresponding to a user input on an electronic device according to various embodiments of the present disclosure. In accordance with an embodiment of the present disclosure, an electronic device (e.g., the acquisition module 210) may obtain a first execution input 615 and a second execution input 617 in different areas (e.g., a first area 619 and a second area 621) on a display 610. In this case, the electronic device (e.g., the execution module 270) may execute at least one event corresponding to each of the first execution input 615 and the second execution input 617. The different areas on the display 610 may, for example, be distinguished by sub areas (e.g., halves of the screen) divided by specific criteria, or distinguished by relative positions of the first and second execution inputs 615 and 617 without specific criteria. In accordance with an embodiment of the present disclosure, the first execution input 615 and the second execution input 617 may be obtained by inputs made by both hands 611 and 613 of one person, or by inputs that are individually made by two persons.

In accordance with an embodiment of the present disclosure, the first execution input 615 obtained in the first area 619 on the display 610 and the second execution input 617 obtained in the second area 621 may be obtained at the same time, or with a time interval.

In accordance with an embodiment of the present disclosure, although in FIG. 6, the first area 619 and the second area 621 on the display 610 are divided into left and right areas for convenience of description, the first area 619 and the second area 621 is not necessarily areas (e.g., the areas which are divided in advance, or divided and displayed noticeably by the user) which are actually divided. If a plurality of user inputs are entered, the first area 619 and the second area 621 may, for example, be divided into various areas such as upper, lower, left, right and diagonal areas, depending on the relative positions among the plurality of user inputs.

In accordance with an embodiment of the present disclosure, the electronic device (e.g., the execution module 270) may deliver events corresponding to the first execution input 615 and the second execution input 617 on a display 635 that is functionally connected to an external device 630. For example, the electronic device (e.g., the input processing module 170) may move a marker 631 corresponding to a first user 611 to the right side 637 by delivering the event corresponding to the first execution input 615 obtained in the first area 619, on the display 635. The electronic device (e.g., the input processing module 170) may move a marker 633 corresponding to a second user 613 to the lower side 639 by delivering the event corresponding to the second execution input 617 obtained in the second area 621, on the display 635.

In accordance with an embodiment of the present disclosure, the markers 631 and 633 may be provided by displaying a selected object with a bold line, displaying a selected object in a transparent way, changing the shape of a selected object, outputting the sound for a selected object, or moving a selected object, and the markers 631 and 633 are not limited to a specific type. The electronic device may change the characters written on the markers 631 and 633, or change the shape or color of the markers 631 and 633, allowing the user to distinguish the inputs which are obtained in different areas.

In accordance with an embodiment of the present disclosure, the electronic device (e.g., the input processing module 170) may store information about the reference axes determined by the first execution input 615 and the second execution input 617, in the memory as a reference axis of the first area 619 and a reference axis of the second area 621. If a plurality of user inputs are obtained through the display 610, the electronic device (e.g., the acquisition module 210) may differently apply at least one of the stored reference axes depending on the relative positions of the plurality of user inputs. For example, the electronic device may apply the reference axis of the first area 619 to any execution input obtained in the first area 619, among the plurality of execution inputs. The electronic device may apply the reference axis of the second area 621 to any execution input obtained in the second area 621, among the plurality of execution inputs.

In accordance with an embodiment of the present disclosure, although not illustrated, events corresponding to the plurality of execution inputs may be executed on a plurality of external devices which are functionally connected to the electronic device. For example, the electronic device (e.g., the execution module 270) may execute a first event corresponding to the first execution input 615 on a first external device (e.g., a TV). On the other hand, the electronic device may execute a second event corresponding to the second execution input 617 on a second external device (e.g., a music player).

In accordance with an embodiment of the present disclosure, an application adjustable by a multi-touch input may be executed in the external device 630. For example, while a function such as View Photos is executed in the external device 630, the user may enlarge or shrink (e.g., zoom in/out) a photo using two fingers. In this case, the first execution input 615 and the second execution input 617 may be recognized as a multi-touch input, and the electronic device may zoom in/out the photo displayed on the display 635 that is functionally connected to the external device 630.

In accordance with various embodiments of the present disclosure, an electronic device for processing a user input may include a display for obtaining a user input, a memory for storing information associated with the user input, and an input processing module that is functionally connected to the memory, and the input processing module may be configured to determine an angle corresponding to the user input by defining a first axis for the display as a reference axis, change a second axis for the display as the reference axis based on at least the angle, and perform at least one event corresponding to the user input on an external device that is functionally connected to the electronic device, based on the second axis.

In accordance with various embodiments of the present disclosure, if a moving distance of the user input is within a specified range, the input processing module may disregard the user input.

In accordance with various embodiments of the present disclosure, the input processing module may determine whether the user input is an execution input for executing at least one event, based on the moving distance corresponding to the user input.

In accordance with various embodiments of the present disclosure, the input processing module may determine whether the user input includes a plurality of execution inputs, based on at least one of the moving distance and the moving direction of the user input.

In accordance with various embodiments of the present disclosure, if the moving distance of the user input includes a first specified distance and a second specified distance, the input processing module may designate each of a first input corresponding to the first specified distance and a second input corresponding to the second specified distance as an execution input for executing the at least one event.

In accordance with various embodiments of the present disclosure, the input processing module may determine the angle based on the moving direction of the user input.

In accordance with various embodiments of the present disclosure, if the angle is within a first specified range, the input processing module may designate, as the second axis, an axis determined by increasing or decreasing an angle of the first axis by a first angle. If the angle is within a second specified range, the input processing module may designate, as the second axis, an axis determined by increasing or decreasing an angle of the first axis by a second angle. If the angle is within a third specified range, the input processing module may determine the first axis as the second axis.

In accordance with various embodiments of the present disclosure, if the angle is within a first specified range, the input processing module may designate, as the second axis, an axis determined by increasing or decreasing an angle of the first axis by a first angle. If the angle is within a second specified range, the input processing module may designate, as the second axis, an axis determined by increasing or decreasing an angle of the first axis by a second angle.

In accordance with various embodiments of the present disclosure, if the user input includes a plurality of execution inputs for executing at least one event, the input processing module may continuously execute an event corresponding to each of the plurality of execution inputs as the at least one event.

In accordance with various embodiments of the present disclosure, in the input processing module, the user input may include a first input obtained in a first area on the display and a second input obtained in a second area on the display. The determining operation may include an operation of designating each of a first reference axis corresponding to the first input and a second reference axis corresponding to the second input, as the reference axis.

In accordance with various embodiments of the present disclosure, the input processing module may execute a first event corresponding to the first input and a second event corresponding to the second input, based on the first reference axis and the second reference axis, respectively.

In accordance with various embodiments of the present disclosure, the input processing module may execute the first event corresponding to the first input on a first external device, and execute the second event corresponding to the second input on a second external device.

In accordance with various embodiments of the present disclosure, the input processing module may provide notification information corresponding to the event to at least one of the output devices that are functionally connected to the electronic device and the external device.

Figure 7:
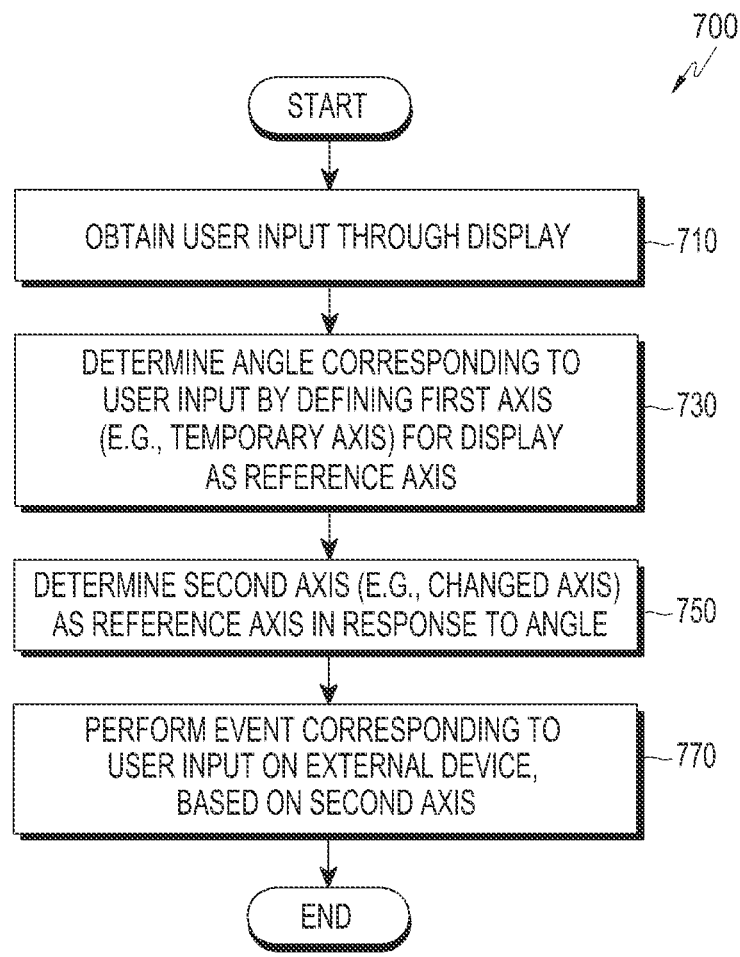
FIG. 7 is a flowchart illustrating a process of changing a coordinate axis of a display according to various embodiments of the present disclosure.

FIG. 7 is a flowchart 700 illustrating a process of changing a coordinate axis of a display according to various embodiments of the present disclosure. In operation 710, the electronic device (e.g., the acquisition module 210) may obtain one or more user inputs through a display (e.g., the display 150). The one or more user inputs may have various characteristics (e.g., the number of user inputs, the moving distance of the user input, the moving direction of the user input, the location of the user input, or the like), and the electronic device may perform an operation (e.g., acquisition of an execution input, disregard of a user input, entry into a multi-touch mode, or the like) corresponding to the one or more user inputs depending on the characteristics.

In operation 730, the electronic device (e.g., the check module 230) may determine an angle corresponding to the one or more user inputs based on the temporary axis for the display. For example, the electronic device may determine a moving direction of the one or more user inputs based on the temporary axis. The electronic device may, for example, determine an angle between the temporary axis and the moving direction of the one or more user input.

In operation 750, the electronic device (e.g., the decision module 250) may determine a changed axis as a reference axis, for each angle. For example, if the angle is within a first range, the electronic device may determine, as a changed axis, an axis determined by increasing or decreasing an angle of the temporary axis by a first angle, and if the angle is within a second range, the electronic device may determine, as a changed axis, an axis determined by increasing or decreasing an angle of the temporary axis by a second angle.

In operation 770, based on the changed axis, the electronic device (e.g., the execution module 270) may execute an event corresponding to the one or more user inputs on an external device that is functionally connected to the electronic device. For example, if the one or more user inputs are made in the left direction based on the changed axis, the electronic device may perform an operation (e.g., Volume Adjustment, Channel Switching, Movement of Cursor, Movement of Screen, or the like) corresponding to the left direction on the external device. In accordance with an embodiment of the present disclosure, the electronic device may provide a notification for the execution of the event to the user through the display or another output device (e.g., a speaker, a motor, a Light Emitting Diode (LED), a receiver, or the like), using the sound, the vibrations, the visual effects or the like.

In accordance with various embodiments of the present disclosure, the method for processing an input in an electronic device may include obtaining a user input through a display that is functionally connected to the electronic device, determining an angle corresponding to the user input by defining a first axis for the display as a reference axis, determining a second axis for the display as the reference axis based on at least the angle, and performing at least one event corresponding to the user input on an external device that is functionally connected to the electronic device, based on the second axis.

In accordance with various embodiments of the present disclosure, the obtaining may include disregarding the user input if a moving distance of the user input is within a specified range.

In accordance with various embodiments of the present disclosure, the obtaining may include determining whether the user input is an execution input for executing the at least one event, based on a moving distance corresponding to the user input.

In accordance with various embodiments of the present disclosure, the obtaining may include determining whether the user input includes a plurality of the execution inputs, based on at least one of a moving distance and a moving direction of the user input.

In accordance with various embodiments of the present disclosure, the obtaining may include designating, if a moving distance of the user input includes a first specified distance and a second specified distance, each of a first input corresponding to the first specified distance and a second input corresponding to the second specified distance as an execution input for executing the at least one event.

In accordance with various embodiments of the present disclosure, the determining of the angle may include determining the angle based on a moving direction of the user input.

In accordance with various embodiments of the present disclosure, the determining of the second axis may include determining the first axis as the second axis, if the angle is within a specified range.

In accordance with various embodiments of the present disclosure, the determining of the second axis may include determining, as the second axis, an axis that is determined by increasing or decreasing an angle of the first axis by a first angle, if the angle is within a first specified range, and determining, as the second axis, an axis that is determined by increasing or decreasing an angle of the first axis by a second angle, if the angle is within a second specified range.

In accordance with various embodiments of the present disclosure, the user input may include a first input obtained in a first area on the display and a second input obtained in a second area on the display, and the determining of the second axis may include determining, as the reference axis, each of a first reference axis corresponding to the first input and a second reference axis corresponding to the second input.

In accordance with various embodiments of the present disclosure, the performing may include performing at least one of a first event corresponding to the first input and a second event corresponding to the second input based on at least one of the first reference axis and the second reference axis.

In accordance with various embodiments of the present disclosure, the performing may include performing a first event corresponding to the first input on a first external device, and performing a second event corresponding to the second input on a second external device.

In accordance with various embodiments of the present disclosure, the performing may include continuously performing an event corresponding to each of a plurality of execution inputs, if the user input includes the plurality of execution inputs for executing the at least one event.

In accordance with various embodiments of the present disclosure, the performing may include providing notification information corresponding to the event through at least one of output devices that are functionally connected to the electronic device and the external device.

Figure 8:
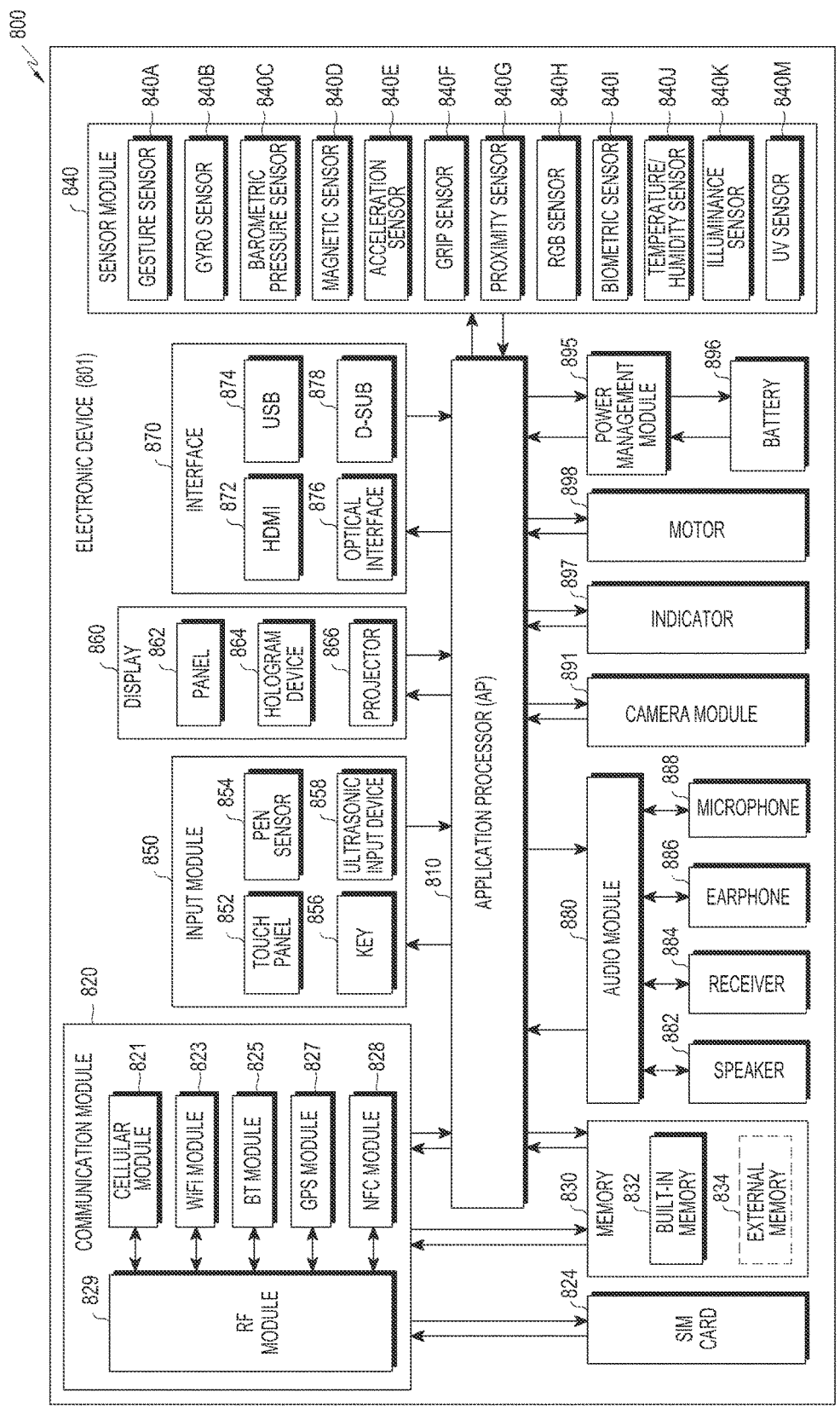
FIG. 8 illustrates a block diagram of an electronic device according to various embodiments of the present disclosure.

FIG. 8 illustrates a block diagram 800 of an electronic device 801 according to various embodiments of the present disclosure. The electronic device 801 may, for example, constitute the whole or part of the electronic device 101 illustrated in FIG. 1.

Referring to FIG. 8, the electronic device 801 may include an Application Processor (AP) 810, a communication module 820, a Subscriber Identification Module (SIM) card 824, a memory 830, a sensor module 840, an input module 850, a display 860, an interface 870, an audio module 880, a camera module 891, a power management module 895, a battery 896, an indicator 897 and a motor 898.

The AP 810 may control a plurality of hardware or software components connected to the AP 810 by driving an Operating System (OS) or an application program, and may process various data including multimedia data and perform operations. The AP 810 may, for example, be implemented with a System on Chip (SoC). In accordance with an embodiment of the present disclosure, the AP 810 may further include a Graphic Processing Unit (GPU) (not shown).

The communication module 820 (e.g., the communication interface 160) may perform data exchange in communication between the electronic device 801 (e.g., the electronic device 101) and other electronic devices (e.g., the electronic device 104 or the server 106) that are connected to the electronic device 810 over the network. In accordance with an embodiment of the present disclosure, the communication module 820 may include a cellular module 821, a WiFi module 823, a BT module 825, a GPS module 827, an NFC module 828, and a Radio Frequency (RF) module 829.

The cellular module 821 may provide voice calls, video calls, SMS services, Internet services or the like over the communication network (e.g., LTE, LTE-A, CDMA, WCDMA, UMTS, WiBro, GSM or the like). The cellular module 821 may, for example, perform identification and authentication for an electronic device in the communication network, using a subscriber identification module (e.g., the SIM card 824). In accordance with an embodiment of the present disclosure, the cellular module 821 may perform at least some of the functions that the AP 810 can provide. For example, the cellular module 821 may perform at least some of the multimedia control functions.

In accordance with an embodiment of the present disclosure, the cellular module 821 may include a Communication Processor (CP). The cellular module 821 may, for example, be implemented with a SoC. Although in FIG. 8, the components such as the cellular module 821 (e.g., the communication processor), the memory 830, the power management module 895 and the like are illustrated as components which are separate from the AP 810, the AP 810 may be implemented to include at least some (e.g., the cellular module 821) of the above components, in accordance with an embodiment of the present disclosure.

In accordance with an embodiment of the present disclosure, the AP 810 or the cellular module 821 (e.g., the communication processor) may load, on a volatile memory, the command or data received from at least one of a non-volatile memory and other components connected thereto, and process the loaded command or data. The AP 810 or the cellular module 821 may store, in a non-volatile memory, the data that the AP 810 or the cellular module 821 receives from at least one of other components, or the data which is generated by at least one of other components.

Each of the WiFi module 823, the BT module 825, the GPS module 827 and the NFC module 828 may, for example, include a processor for processing the data transmitted/received therethrough. Although in FIG. 8, the cellular module 821, the WiFi module 823, the BT module 825, the GPS module 827 and the NFC module 828 are illustrated as separate blocks, at least some (e.g., two or more) of the cellular module 821, the WiFi module 823, the BT module 825, the GPS module 827 and the NFC module 828 may be incorporated into one Integrated Chip (IC) or IC package, in accordance with an embodiment of the present disclosure. For example, at least some (e.g., a communication processor corresponding to the cellular module 821 and a WiFi processor corresponding to the WiFi module 823) of the processors corresponding to the cellular module 821, the WiFi module 823, the BT module 825, the GPS module 827 and the NFC module 828 may be implemented with one SoC.

The RF module 829 may perform transmission/reception of data (e.g., transmission/reception of RF signals). The RF module 829, though not illustrated, may, for example, include a transceiver, a Power Amp Module (PAM), a frequency filter, a Low Noise Amplifier (LNA) or the like. The RF module 829 may further include the parts (e.g., conductors, conducting wires or the like) for transmitting/ receiving electromagnetic waves in the free space in wireless communication. Although in FIG. 8, the cellular module 821, the WiFi module 823, the BT module 825, the GPS module 827 and the NFC module 828 are illustrated to share one RF module 829 with each other, at least one of the cellular module 821, the WiFi module 823, the BT module 825, the GPS module 827 and the NFC module 828 may perform transmission/reception of RF signals through a separate RF module, in accordance with an embodiment of the present disclosure.

The SIM card 824 may be a card that includes a subscriber identification module, and may be inserted into a slot that is formed in a specific position of the electronic device. The SIM card 824 may include unique identification information (e.g., Integrated Circuit Card Identifier (ICCID)) or subscriber information (e.g., International Mobile Subscriber Identity (IMSI)).

The memory 830 (e.g., the memory 130) may include a built-in memory 832 or an external memory 834. The built-in memory 832 may, for example, include at least one of a volatile memory (e.g., Dynamic RAM (DRAM), Static RAM (SRAM), Synchronous Dynamic RAM (SDRAM) or the like) and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, NOR flash memory or the like).

In accordance with an embodiment of the present disclosure, the built-in memory 832 may be a Solid State Drive (SSD). The external memory 834 may further include a flash drive such as, for example, Compact Flash (CF), Secure Digital (SD), Micro Secure Digital (Micro-SD), Mini Secure Digital (Mini-SD), extreme Digital (xD), memory stick or the like. The external memory 834 may be functionally connected to the electronic device 801 through a variety of interfaces. In accordance with an embodiment of the present disclosure, the electronic device 801 may further include a storage device (or a storage medium) such as a hard drive.

The sensor module 840 may measure the physical quantity or detect the operating status of the electronic device 801, and convert the information about the measurement or detection into an electrical signal. The sensor module 840 may, for example, include at least one of a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (e.g., a Red, Green, Blue (RGB) sensor), a biometric sensor 840I, a temperature/humidity sensor 840J, an illuminance sensor 840K, and a Ultra Violet (UV) sensor 840M. Additionally or alternatively, the sensor module 840 may, for example, include an Electronic nose (E-nose) sensor (not shown), electromyography (EMG) sensor (not shown), an electroencephalogram (EEG) sensor (not shown), an electrocardiogram (ECG) sensor (not shown), an Infrared Ray (IR) sensor (not shown), an iris sensor (not shown), a fingerprint sensor (not shown), or the like. The sensor module 840 may further include a control circuit for controlling one or more sensors included therein.

The input module 850 may include a touch panel 852, a (digital) pen sensor 854, a key 856, an ultrasonic input device 858 or the like. The touch panel 852 may, for example, recognize a touch input in at least one of a capacitive way, a resistive way, an infrared way, and an ultrasonic way. The touch panel 852 may further include a control circuit. In the case of the capacitive way, the touch panel 852 may recognize the physical contact (or touch) or the proximity. The touch panel 852 may further include a tactile layer. In this case, the touch panel 852 may provide a tactile feedback to the user.

The (digital) pen sensor 854 may, for example, be implemented, using the same or similar way as/to the method of receiving a user's touch input or using a separate recognition sheet. The key 856 may, for example, include a physical button, an optical key, a keypad or the like. The ultrasonic input device 858 is a device that can check the data by detecting sound waves with a microphone (e.g., a microphone 888) in the electronic device 801, by means of an input tool that generates ultrasonic signals. The ultrasonic input device 858 may enable wireless recognition. In accordance with an embodiment of the present disclosure, the electronic device 801 may receive a user input from an external device (e.g., a computer or a server) connected thereto, using the communication module 820.

The display 860 (e.g., the display 150) may include a panel 862, a hologram device 864, a projector 866 or the like. The panel 862 may be, for example, a Liquid-Crystal Display (LCD) panel, an Active-Matrix Organic Light-Emitting Diode (AM-OLED) panel, or the like. The panel 862 may, for example, be implemented in a flexible way, a transparent way, or a wearable way. The panel 862, together with the touch panel 852, may be configured as a single module. The hologram device 864 may show three-dimensional (3D) images in the air, using the interference of light. The projector 866 may display images by projecting light on the screen. The screen may, for example, be located inside or outside the electronic device 801. In accordance with an embodiment of the present disclosure, the display 860 may further include a control circuit for controlling the panel 862, the hologram device 864 or the projector 866.

The interface 870 may, for example, include an HDMI 872, a USB 874, an optical interface 876, or a D-subminiature (D-sub) 878. The interface 870 may, for example, be incorporated into the communication interface 160 shown in FIG. 1. Additionally or alternatively, the interface 870 may, for example, include a Mobile High-Definition Link (MHL) interface, a Secure Digital (SD) card/Multi-Media Card (MMC) interface, or an Infrared Data Association (IrDA) interface.

The audio module 880 may convert sounds into an electrical signal, and vice versa. At least some of the components of the audio module 880 may, for example, be incorporated into the I/O interface 140 illustrated in FIG. 1. The audio module 880 may, for example, process the sound information, which is input/output through a speaker 882, a receiver 884, an earphone 886, the microphone 888 or the like.

The camera module 891, which is a device capable of shooting (or capturing) still images and videos, may include at least one image sensor (e.g., a front sensor or a rear sensor), a lens (not shown), an Image Signal Processor (ISP) (not shown), a flash (e.g., an LED or a xenon lamp) (not shown), or the like, in accordance with an embodiment of the present disclosure.

The power management module 895 may manage the power of the electronic device 801. Although not illustrated, the power management module 895 may, for example, include a Power Management Integrated Circuit (PMIC), a charger Integrated Circuit (IC), a battery, a fuel gauge, or the like.

The PMIC may, for example, be mounted in an integrated circuit or an SoC semiconductor. The charging scheme may be classified into a wired scheme and a wireless scheme. The charger IC may charge a rechargeable battery, and prevent the inflow of over-voltage or over-current from the charger. In accordance with an embodiment of the present disclosure, the charger IC may include a charger IC for at least one of a wired charging scheme and a wireless charging scheme. The wireless charging scheme may, for example, include a magnetic resonance scheme, an electromagnetic induction scheme, an electromagnetic scheme or the like, and an additional circuit (e.g., a coil loop, a resonant circuit, a rectifier or the like) for wireless charging may be added.

The battery gauge may, for example, measure the level, the charging voltage, the charging current, or the temperature of the battery 896. The battery 896 may store or generate the electricity, and supply power to the electronic device 801, using the stored or generated electricity. The battery 896 may, for example, include a rechargeable battery or a solar battery.

The indicator 897 may indicate particular states of the electronic device 801 or its part (e.g., the AP 810), for example, the boot state, the message status, the charging status or the like. The motor 898 may convert an electrical signal into mechanical vibrations. Although not illustrated, the electronic device 801 may include a processing unit (e.g., a GPU) for support of a mobile TV. The processing unit for support of a mobile TV may, for example, process the media data that is based on the standard such as Digital Multimedia Broadcasting (DMB), Digital Video Broadcasting (DVB) or Media Flow.

Each of the aforementioned components of the electronic device according to various embodiments of the present disclosure may be configured with one or more components, and the name thereof may vary depending on the type of the electronic device. The electronic device according to various embodiments of the present disclosure may include at least one of the aforementioned components, and the electronic device may omit some of the components or may further include other additional components. As some of the components of the electronic device according to various embodiments of the present disclosure may be configured as a single entity by being combined, the functions of the components before their combination may be performed in the same way.

Figure 9:
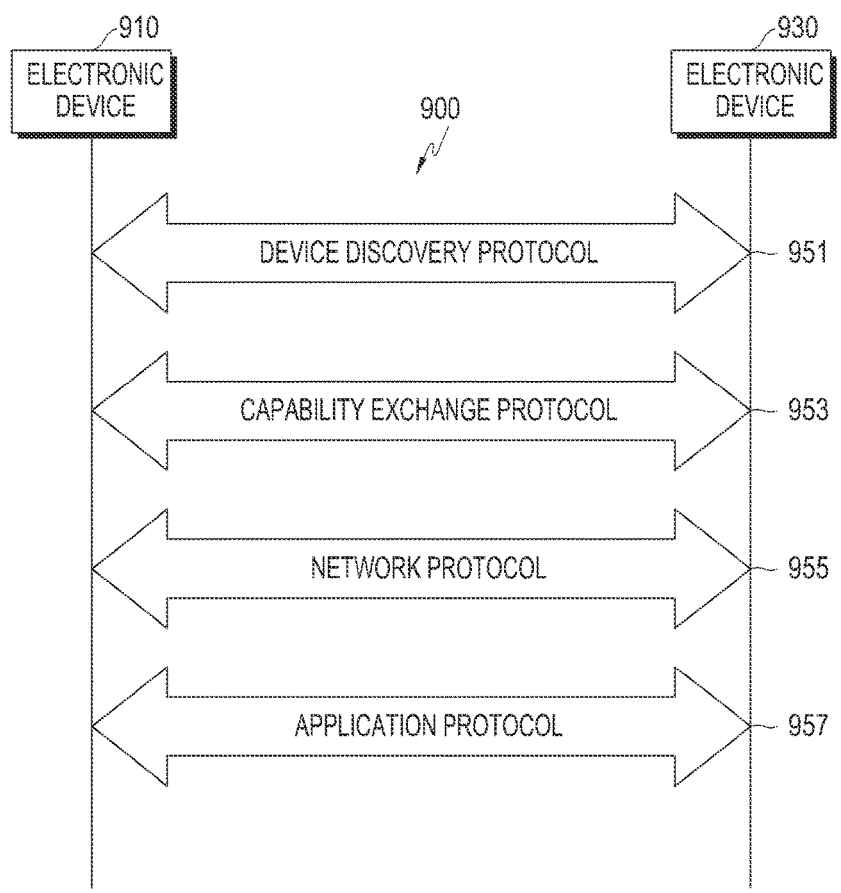
FIG. 9 illustrates a communication protocol between multiple electronic devices according to various embodiments of the present disclosure.

FIG. 9 illustrates a communication protocol 900 between multiple electronic devices (e.g., an electronic device 910 and an electronic device 930) according to various embodiments of the present disclosure.

Referring to FIG. 9, the communication protocol 900 may, for example, include a device discovery protocol 951, a capability exchange protocol 953, a network protocol 955, an application protocol 957, and the like.

In accordance with an embodiment of the present disclosure, the device discovery protocol 951 may be a protocol by which an electronic device (e.g., the electronic device 910 or the electronic device 930) may detect an external electronic device that can communicate with the electronic device, or may connect with the detected external electronic device. For example, the electronic device 910 (e.g., the electronic device 101) is a device that can communicate with the electronic device 930 through the communication method (e.g., WiFi, BT, USB or the like) that can be used in the electronic device 910, using the device discovery protocol 951, and the electronic device 910 may detect the electronic device 930 (e.g., the electronic device 104). The electronic device 910 may obtain and store identification information about the detected electronic device 930, using the device discovery protocol 951, for communication connection with the electronic device 930. The electronic device 910 may, for example, establish a communication connection with the electronic device 930 based on at least the identification information.

In accordance with certain embodiments of the present disclosure, the device discovery protocol 951 may be a protocol for performing mutual authentication between multiple electronic devices. For example, the electronic device 910 may perform authentication between the electronic device 910 and the electronic device 930 based on communication information (e.g., Media Access Control (MAC) address, Universally Unique Identifier (UUID), Subsystem Identification (SSID), Internet Protocol (IP) address or the like) for a connection with at least the electronic device 930.

In accordance with an embodiment of the present disclosure, the capability exchange protocol 953 may be a protocol for exchanging information related to the capability of the service that can be supported in at least one of the electronic device 910 and the electronic device 930. For example, the electronic device 910 and the electronic device 930 may exchange with each other the information related to the capability of the service currently provided by them, using the capability exchange protocol 953. The exchangeable information may include identification information indicating a specific service among a plurality of services that can be supported in the electronic device 910 and the electronic device 930. For example, the electronic device 910 may receive identification information of a specific service provided by the electronic device 930 from the electronic device 930, using the capability exchange protocol 953. In this case, the electronic device 910 may determine whether the electronic device 910 can support the specific service, based on the received identification information.

In accordance with an embodiment of the present disclosure, the network protocol 955 may be a protocol for controlling the flow of data (which is transmitted and received to provide the service in cooperation with each other) between electronic devices (e.g., the electronic device 910 and the electronic device 930) that are connected to each other to enable communication. For example, at least one of the electronic device 910 and the electronic device 930 may perform error control, data quality control or the like, using the network protocol 955. Additionally or alternatively, the network protocol 955 may determine a transmission format of the data exchanged between the electronic device 910 and the electronic device 930. At least one of the electronic device 910 and the electronic device 930 may manage (e.g., connect or terminate) at least a session for mutual data exchange, using the network protocol 955.

In accordance with an embodiment of the present disclosure, the application protocol 957 may be a protocol for providing the procedure or information, for exchanging data related to the service that is provided to an external electronic device. For example, the electronic device 910 (e.g., the electronic device 101) may provide a service to the electronic device 930 (e.g., the electronic device 104 or the server 106) using the application protocol 957.

In accordance with an embodiment of the present disclosure, the communication protocol 900 may include a standard communication protocol, a communication protocol (e.g., a communication protocol that is specified by the communication device manufacturer or the network supplier on its own) specified by an individual or a group, or a combination thereof.

The term 'module' used in various embodiments of the present disclosure may, for example, refer to a unit that includes at least one of hardware, software and firmware, or a combination thereof. The term 'module' may, for example, be interchangeably used with the terms such as 'unit', 'logic', 'logical block', 'component', 'circuit' or the like. The 'module' may be the minimum unit of the unitized part or a part thereof. The 'module' may be the minimum unit of performing one or more functions, or a part thereof. The 'module' may be implemented mechanically or electronically. For example, the 'module' according to various embodiments of the present disclosure may include at least one of an Application-Specific Integrated Circuit (ASIC) chip, a Field-Programmable Gate Array (FPGA), and a programmable-logic device, each of which performs certain operations that are known or to be developed in the future.

At least a part of the device (e.g., modules or their functions) or method (e.g., operations) according to various embodiments of the present disclosure may, for example, be implemented with instructions that are stored in a non-transitory computer-readable storage medium, which is configured in the form of a programming module. As for the instruction, if the instruction is executed by one or more processors (e.g., the processor 120), the one or more processors may perform a function corresponding to the instruction. The non-transitory computer-readable storage medium may, for example, be the memory 130. At least a part of the programming module may, for example, be implemented (e.g., executed) by the processor 120. At least a part of the programming module may include, for example, a module, a program, a routine, a set of instructions, a process or the like, for performing one or more functions.

The non-transitory computer-readable recording medium may include magnetic media such as hard disks, floppy disks and magnetic tapes; optical media such as Compact Disc Read Only Memories (CD-ROMs) and Digital Versatile Discs (DVDs), magneto-optical media such as floptical disks; and hardware devices specifically configured to store and execute program instructions (e.g., programming modules), such as Read Only Memories (ROMs), Random Access Memories (RAMs), and flash memories. The program instructions may include not only the machine code created by a compiler, but also the high-level language code that can be executed by the computer, using an interpreter or the like. The hardware device may be configured to operate as one or more software modules to perform the operations according to various embodiments of the present disclosure, and vice versa.

The module or programming module according to various embodiments of the present disclosure may include at least one of the aforementioned components, and may omit some of the components or may further include other additional components. Operations performed by the module, programming module or other components according to various embodiments of the present disclosure may be executed in a sequential way, in a parallel way, in a repeated way, or in a heuristic way. Some of the operations may be omitted or executed in a different order, or other operations may be added.

In accordance with various embodiments of the present disclosure, in a storage medium storing instructions, when the instructions are executed by at least one processor, the instructions may be set to allow the at least one processor perform at least one operation, and the at least one operation may include an operation of obtaining a user input, an operation of determining an angle of the user input by defining a first axis for the display as a reference axis, an operation of changing a second axis for the display as the reference axis based on at least the angle, and an operation of performing at least one event corresponding to the user input on an external device that is functionally connected to the electronic device, based on the second axis.

As is apparent from the foregoing description, the input processing method and apparatus according to various embodiments of the present disclosure may, for example, adjust the display's reference axis for processing the user input, thereby improving the recognition for the user input that is entered through the display.

In addition, the input processing method and apparatus according to various embodiments of the present disclosure may, for example, control the display based on the user input, thereby improving the accuracy of the event corresponding to the user input, which is executed on another electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for processing a plurality of inputs, the method comprising:
   receiving a first user input through a display that is functionally connected to an electronic device, wherein the first user input includes a drag gesture corresponding to a first direction;
   identifying a plurality of angles between the first direction and each of two predetermined axes;
   defining a first axis as a reference axis from among the two predetermined axes, wherein an angle between the first axis and the first direction is smaller than an angle between a remaining predetermined axis of the two predetermined axes and the first direction;
   defining a second axis as a changed reference axis based on the angle between the first axis and the first direction;
   receiving a second user input starting from a release point of the first user input, wherein the second user input includes a drag gesture corresponding to a second direction;
   identifying a plurality of angles between the second direction and each of a plurality of axes, wherein the plurality of axes includes the remaining predetermined axis and the second axis;
   determining the second user input as a third user input in a third direction corresponding to one of the two predetermined axes, based on the plurality of angles between the second direction and the each of the plurality of axes; and
   transmitting information on the first user input and the third user input in the third direction to an external device for causing the external device to perform at least one event corresponding to the first user input and the third user input in the third direction.

2. The method of claim 1, wherein the receiving of the first user input comprises:
   disregarding the first user input if a moving distance of the first user input is within a specified range.

3. The method of claim 1, wherein the receiving of the first user input comprises:
   determining whether the first user input is an execution input for performing the at least one event, based on a moving distance corresponding to the first user input.

4. The method of claim 3, wherein the receiving of the first user input further comprises:

determining whether the first user input includes a plurality of the execution inputs, based on at least one of a moving distance and the first direction of the first user input.

5. The method of claim 1, wherein the defining of the second axis comprises:
defining the first axis as the second axis, if the angle between the first axis and the first direction is within a specified range.

6. The method of claim 1, wherein the defining of the second axis comprises:
defining, as the second axis, an axis that is determined by increasing or decreasing the angle between the first axis and the first direction by a first angle, if the angle between the first axis and the first direction is within a first specified range; and
defining, as the second axis, an axis that is determined by increasing or decreasing the angle between the first axis and the first direction by a second angle, if the angle between the first axis and the first direction is within a second specified range.

7. The method of claim 1,
wherein the first user input includes a first input received in a first area on the display and a second input received in a second area on the display, and
wherein the defining of the second axis comprises:
determining, as the reference axis, each of a first reference axis corresponding to the first input and a second reference axis corresponding to the second input.

8. The method of claim 7, wherein the transmitting of the information comprises:
causing the external device to perform at least one of a first event corresponding to the first input and a second event corresponding to the second input based on at least one of the first reference axis and the second reference axis.

9. The method of claim 7, wherein the transmitting of the information comprises:
causing the external device to perform a first event corresponding to the first input on a first external device; and
causing the external device to perform a second event corresponding to the second input on a second external device.

10. An electronic device for processing a plurality of inputs, the electronic device comprising:
a display configured to receive a first user input, wherein the first user input includes a drag gesture corresponding to a first direction;
a memory configured to store information associated with the first user input; and
at least one input processor that is functionally connected to the memory,
wherein the at least one input processor is configured to:
identify a plurality of angles between the first direction and each of two predetermined axes,
define a first axis as a reference axis from among the two predetermined axes, wherein an angle between the first axis and the first direction is smaller than an angle between a remaining predetermined axis of the two predetermined axes and the first direction,
define a second axis as a changed reference axis based on the angle between the first axis and the first direction,
receive a second user input starting from a release point of the first user input, wherein the second user input includes a drag gesture corresponding to a second direction,
identify a plurality of angles between the second direction and each of a plurality of axes, wherein the plurality of axes includes the remaining predetermined axis and the second axis,
determine the second user input as a third user input in a third direction corresponding to one of the two predetermined axes, based on the plurality of angles between the second direction and the each of the plurality of axes, and
transmit information on the first user input and the third user input in the third direction to an external device for causing the external device to perform at least one event corresponding to the first user input and the third user input in the third direction.

11. The electronic device of claim 10, wherein the at least one input processor is further configured to disregard the first user input if a moving distance of the first user input is within a specified range.

12. The electronic device of claim 10, wherein the at least one input processor is further configured to determine whether the first user input is an execution input for performing the at least one event, based on a moving distance corresponding to the first user input.

13. The electronic device of claim 10, wherein the at least one input processor is further configured to determine whether the first user input includes a plurality of the execution inputs, based on at least one of a moving distance and the first direction of the first user input.

14. The electronic device of claim 10, wherein the at least one input processor is further configured to designate, if a moving distance of the first user input includes a first specified distance and a second specified distance, each of a first input corresponding to the first specified distance and a second input corresponding to the second specified distance as an execution input for performing the at least one event.

15. The electronic device of claim 10, wherein the at least one input processor is further configured to:
define, as the second axis, an axis that is determined by increasing or decreasing the angle between the first axis and the first direction by a first angle, if the angle between the first axis and the first direction is within a first specified range;
define, as the second axis, an axis that is determined by increasing or decreasing the angle between the first axis and the first direction by a second angle, if the angle between the first axis and the first direction is within a second specified range; and
define the first axis as the second axis, if the angle between the first axis and the first direction is within a specified range.

16. The electronic device of claim 10, wherein the at least one input processor is further configured to provide notification information corresponding to the at least one event through at least one output device that is functionally connected to at least one of the electronic device and the external device.

17. A non-transitory computer-readable medium recording a program that when executed on a computer causes the computer to execute operations of:
receiving a first user input through a display, wherein the first user input includes a drag gesture corresponding to a first direction;

identifying a plurality of angles between the first direction and each of two predetermined axes;

defining a first axis as a reference axis from among the two predetermined axes, wherein an angle between the first axis and the first direction is smaller than an angle between a remaining predetermined axis of the two predetermined axes and the first direction;

defining a second axis as a changed reference axis based on the angle between the first axis and the first direction;

receiving a second user input starting from a release point of the first user input, wherein the second user input includes a drag gesture corresponding to a second direction;

identifying a plurality of angles between the second direction and each of a plurality of axes, wherein the plurality of axes includes the remaining predetermined axis and the second axis;

determining the second user input as a third user input in a third direction corresponding to one of the two predetermined axes, based on the plurality of angles between the second direction and the each of the plurality of axes; and transmitting information on the first user input and the third user input in the third direction to an external device for causing the external device to perform at least one event corresponding to the first user input and the third user input in the third direction.

* * * * *